(12) United States Patent
Huang

(10) Patent No.: US 9,985,825 B2
(45) Date of Patent: May 29, 2018

(54) INTERNET OF THINGS DEVICE MANAGEMENT SYSTEM AND METHOD FOR AUTOMATICALLY MONITORING AND DYNAMICALLY REACTING TO EVENTS AND RECONSTRUCTING APPLICATION SYSTEMS

(71) Applicant: International Mobile IOT Corp, Taipei (TW)

(72) Inventor: Jung-Tang Huang, Taipei (TW)

(73) Assignee: INTERNATIONAL MOBILE IOT CORP., Taipei (TW)

( * ) Notice: Subject to any disclaimer, the term of this patent is extended or adjusted under 35 U.S.C. 154(b) by 179 days.

(21) Appl. No.: 15/060,619

(22) Filed: Mar. 4, 2016

(65) Prior Publication Data

US 2016/0261458 A1  Sep. 8, 2016

Related U.S. Application Data

(60) Provisional application No. 62/129,045, filed on Mar. 6, 2015, provisional application No. 62/140,420, filed on Mar. 30, 2015.

(51) Int. Cl.

| G06F 15/173 | (2006.01) |
| H04L 12/24 | (2006.01) |
| H04L 29/08 | (2006.01) |
| H04W 4/02 | (2018.01) |
| H04L 12/26 | (2006.01) |
| H04W 4/00 | (2018.01) |
| H04W 84/12 | (2009.01) |

(52) U.S. Cl.
CPC ...... *H04L 41/0668* (2013.01); *H04L 43/0817* (2013.01); *H04L 67/1021* (2013.01); *H04L 67/12* (2013.01); *H04W 4/02* (2013.01); *H04W 4/008* (2013.01); *H04W 4/80* (2018.02); *H04W 84/12* (2013.01)

(58) Field of Classification Search
CPC ............ H04L 41/0668; H04L 43/0817; H04L 67/1021; H04L 67/12; H04W 4/02; H04W 4/008; H04W 84/12
USPC .................................................. 709/224, 226
See application file for complete search history.

(56) References Cited

U.S. PATENT DOCUMENTS

| 2015/0067154 A1* | 3/2015 | Ly ...................... H04L 43/0876 709/224 |
| 2015/0071052 A1* | 3/2015 | Hershberg ............ H04W 24/04 370/216 |
| 2016/0198430 A1* | 7/2016 | Jimenez ................ H04W 4/006 455/456.5 |
| 2017/0187993 A1* | 6/2017 | Martch ................ B64C 39/024 |
| 2017/0248429 A1* | 8/2017 | Ponomarev ............ G01C 21/30 |

* cited by examiner

*Primary Examiner* — Wing F Chan
*Assistant Examiner* — Joseph Maniwang
(74) *Attorney, Agent, or Firm* — JCIPRNET

(57) ABSTRACT

An IoT device management system and method that automatically monitors and dynamically reacts to events and reconstructs application systems is provided. The IoT device management system can be a location-based network system includes a plurality of communication nodes.

20 Claims, 30 Drawing Sheets

US 9,985,825 B2

INTERNET OF THINGS DEVICE MANAGEMENT SYSTEM AND METHOD FOR AUTOMATICALLY MONITORING AND DYNAMICALLY REACTING TO EVENTS AND RECONSTRUCTING APPLICATION SYSTEMS

FIELD

The disclosure relates to the field of Internet of Things (IoT), and more specifically, to IoT device management system and method that automatically monitors and dynamically reacts to events and reconstructs application systems.

BACKGROUND

With the rapid development of embedded devices and further fusion of communication technology with the Internet technology, the popularity of the Internet of Things (IoT) is increasing day by day. The IoT is an emerging technology, combining different information sensing devices, such as BLUETOOTH, ZigBee, LoRA, Wi-Fi, sub-Giga Wi-Fi, radio frequency identifications (RFID), sensors, global positioning systems (GPS), and laser scanners, with the Internet to form a huge network.

The IoT is a vision of connectivity for anything, at anytime and from anywhere, which can have a dramatic impact on daily lives of people. It is recognized as an extension of today's Internet to the real world of physical objects. Various IoT platforms have been developed in the past that allow quick and easy development, deployment and administration of IoT applications. Environmental and vital signs monitoring, monitoring and control of industrial processes including agriculture, factories, smart spaces, and smart cities are some examples of the IoT applications.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
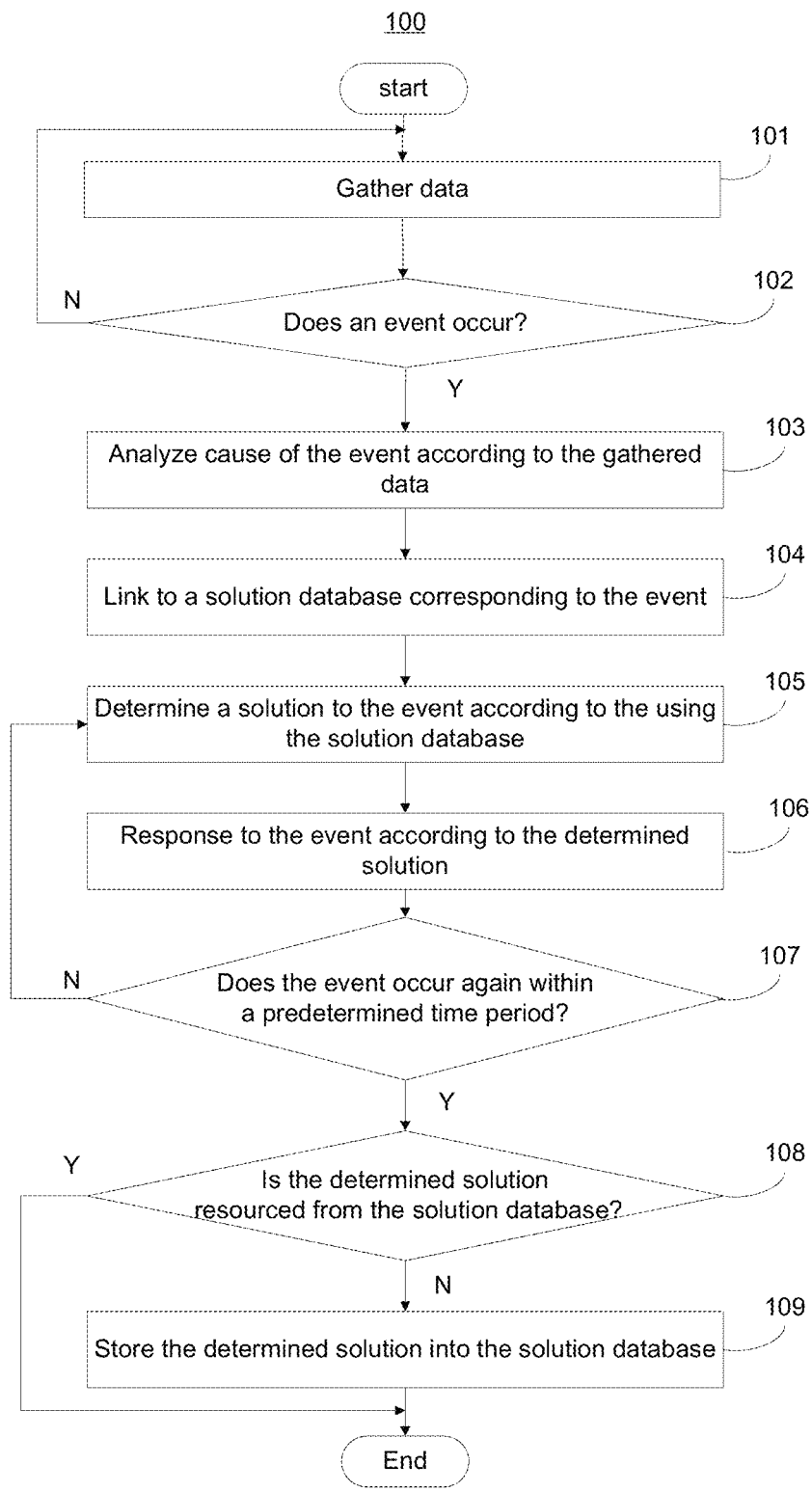
FIG. 1 illustrates a flow chart of exemplary IoT device management method that automatically monitors and dynamically reacts for events, according to various implementations of the disclosure.

The present disclosure will now be described more fully hereinafter with reference to the accompanying drawings, in which exemplary embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" or "containing" or "contains" when used herein, specify the presence of stated features, regions, integers, steps, operations, elements, and/or components, but do not preclude the presence or addition of one or more other features, regions, integers, steps, operations, elements, components, and/or groups thereof. It will be also understood that the terms "a portion of" or "a number of" when used herein, specify the presence of stated elements features, regions, integers, steps, operations, elements, and/or components, but do not preclude the presence or addition of one or more other features, regions, integers, steps, operations, elements, components, and/or groups thereof. For example, the term "a portion of A" does not preclude "A as a whole" or "not any A" when used herein. Also, for another example, the term "a number of B" also includes "one or more B" or "none of B".

It will be understood that the term "and/or" includes any and all combinations of one or more of the associated listed items. It will also be understood that, although the terms first, second, third etc. can be used herein to describe various elements, components, regions, parts and/or sections, these elements, components, regions, parts and/or sections should not be limited by these terms. These terms are only used to distinguish one element, component, region, part or section from another element, component, region, layer or section. Thus, a first element, component, region, part or section discussed below could be termed a second element, component, region, layer or section without departing from the teachings of the present disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The present disclosure discloses an Internet of Things (IoT) device management system and method for automatically monitoring and dynamically reacting for events to analyze causes of the events and corresponding solutions. The analysis can be based on predefined parameters or gathered data. The data can include sensing values from the IoT devices or other data from the Internet, such as public databases and social network posts. The events can include, but is not limited to, environmental events, vital signs events, and any other suitable events. The environmental events include, such as fire, or rain, for example. The vital signs events include, such as high blood pressure, sudden cardiac arrest, fever, for example. The other suitable events include, such as shortage of electrical power in a region, for example. Monitoring events include detecting whether one or more events occur using the IoT devices, such as, detecting whether a fire occurs using a thermometer. Reacting for events can include solving one or more events using the IoT devices, such as, fire extinguishing using a sprinkler. The present disclosure also discloses an IoT device management system and method that can be provided for automatically monitoring and dynamically reconstructing application systems. In some embodiments, the IoT devices can include, but are not limited to information sensing devices and application devices. The information sensing device can include environmental parameter sensing devices, physiological parameter sensing devices, and any other suitable sensing devices. The environmental parameter sensing devices can include, thermometers, humidity sensors, water pressure sensors, air pressure sensors, for example. The physiological parameter sensing devices can include, blood-pressure meters, cardiotachometers, thermometers, electrocardiogram meters, oximeter, electroencephalogram sensors, plantar pressure sensors, for example. The other suitable sensing devices can include, voltmeter, galvanometer, BLUETOOTH, ZigBee, LoRa, Wi-Fi, sub-Giga Wi-Fi, 802.1 Time Sensitive Networking, LPWAN, radio frequency identifications (RFID), global positioning systems (GPS), laser scanners, cameras, and camcorders, for example.

In some embodiments, the application devices can include actuators and any device which can execute some particular functions. The actuators can include, fans, air conditioners, for example. The other devices can include, refrigerators, washing machines, sprinklers, light-fixtures, alert devices, computers, for example.

The IoT devices can be controlled and managed by a cloud server that is connected with the IoT devices via a network (e.g., the Internet).

Each of the application systems includes one or more IoT devices and a set of one or more programs designed to carry out operations for a specific application that controls the IoT devices to perform tasks that benefit users. The application systems can include, but is not limited to, environmental events control systems, such as a temperature control system, for example, vital signs events control system, such as intravenous drop injection control system, for example, social events, such as electrical power control system, for example, and any other suitable control systems. Monitoring an application system means detecting whether tasks, which are performed using the IoT devices controlled by the application system, meet a predetermined evaluation criterion or reward criterion. Reconstructing an application system means reconstructing the IoT devices in the application system, when the tasks do not meet the predetermined evaluation criterion or reward criterion. The reconstruction of an application system can include adding additional, idle or movable, IoT devices into the application system. Alternatively or additionally, the reconstruction of an application system can include removing, idle, redundant or broken IoT devices from the application system. Alternatively or additionally, the reconstruction of an application system can include reassigning, regrouping or reconfiguring IoT devices which have finished missions into a new mission from the application system.

FIG. 1 illustrates a block diagram of an exemplary IoT device management method that automatically monitors and dynamically reacts for events, according to various implementations of the disclosure. An exemplary method 100 is provided by way of examples, as there are a variety of ways to carry out the method. Each block shown in FIG. 1 represents one or more processes, methods or subroutines, carried out in the exemplary method 100. Furthermore, the illustrated order of blocks is by example only and the order of the blocks can change according to the present disclosure. Additional blocks may be added or fewer blocks may be utilized, without departing from this disclosure. The exemplary method 100 can begin at block 101.

At block 101, a cloud server, which is connected with IoT devices via a network and is able to control and manage all of the IoT devices, gathers data upon request or continuously. The gathered data can include sensed data, related information and/or knowledge data of occurred events, and any other useful data. The gathered data can be used to build models to determine whether an event occurs, and/or analyze causes of the occurred event. Alternatively or additionally, the gathered data can also be used to build models to create or determine one or more solutions to solve the occurred event.

In some embodiments, the sensed data can be measured temperature, captured images, or other data, which is sensed by the information sensing device 210. The related information of the occurred event includes time, location(s), people, and/or device(s) of the occurred event.

In some embodiments, the cloud server generates descriptive language of the occurred event. For example, when the thermometer measures a temperature of a room is 50 degrees Celsius, then, the cloud server can generate descriptive language of "high temperature," "raised temperature" or the like. In another example, when a blood-pressure meters measures that a blood-pressure of a person is "180/100 mmHg", the cloud server can generate descriptive language of "Hypertension," "HTN" or "high blood pressure." The related knowledge data of the occurred event can be searched according to the descriptive language.

At block 102, the cloud server detects whether an event occurs according to the gathered data. In some embodiments, the event can be particular data sensed by information sensing devices, such as an image of a person captured by a camera, a high temperature measured by a thermometer, or a voice signal captured by voice recording equipment, for example. The event can also be an operation of application devices, such as, turning on of a smart TV, running of particular application software in a computer. In some embodiments, whether an event occurs is determined based on predetermined thresholds (depicted below in FIG. 4), or based on predictive model built according to constantly gathered data (depicted below in FIG. 5).

At block 103, the cloud server analyzes one or more causes of the occurred event according to the gathered data. For example, if an event is a temperature of a room measured by a thermometer being 100 degrees Celsius (C), the cloud server can analyze that a cause of the event is the room is on fire. In another example, if an event is a temperature of a room measured by a thermometer being 35 degrees C., the cloud server can analyze that a cause of the event is an air conditioner of the room is turned down or turned off or is broken.

At block 104, the cloud server links to a solution database corresponding to the occurred event. In some embodiments, there are different solution database corresponding to different kinds of events. Each solution database stores a plurality of solutions. In some embodiments, the solution database can include previous solutions that successfully solve occurred events, and each of such previous solutions includes related information, such as, time, location, device, and/or people receiving the solution. Alternatively or additionally, the solution database can also include solutions which are predetermined by a user, such as standard operation procedures (SOPs), or created using a model built according to gathered data.

At block 105, the cloud server determines a solution of the occurred event according to the gathered data based on the solution database. The cloud server can compare the related information of the occurred event and the related information of the solutions in the solution database, and determine a proper solution from the solution database. Alternatively, if no proper solution exits in the solution database, the cloud server can create a solution based on the sensed data and/or knowledge data of the occurred event.

At block 106, the cloud server responses to the occurred event according to the determined solution. In some embodiments, the cloud server controls the IoT devices to solve the occurred event based on the determined solution. For example, the cloud server controls a sprinkler to put out the fire, or turn up an air conditioner for regulating the temperature to be a comfortable temperature, for example In some embodiments, the method 100 further includes processes of checking an effect of the determined solution, depicted at blocks 107 to 109.

At block 107, the cloud server detects whether a same event occurs again within a predetermined time period. The predetermined time period can be different according to different events. If the same event occurs again within the predetermined time period, the determined solution can be improper, or one or more of the IoT devices that are controlled to solve the occurred event are broken down. When the same event occurs again in the predetermined time period, block 105 is repeated to change another solution or update the current determined solution. The current determined solution can be updated by repairing or replacing the broken devices.

When no same event occurs again within the predetermined time period, it is represented that the determined solution is successful, and at block 108, the cloud server checks whether the determined solution is resourced from the solution database. When the determined solution is resourced from the solution database, the procedure ends. Otherwise, when the determined solution is newly created, the cloud server stores the determined solution into the solution database, and further stores related information of the determined solution into the solution database. As mentioned above, the related information of the solution includes such as, time, location, device, and/or people that receive the solution.

Figure 2:
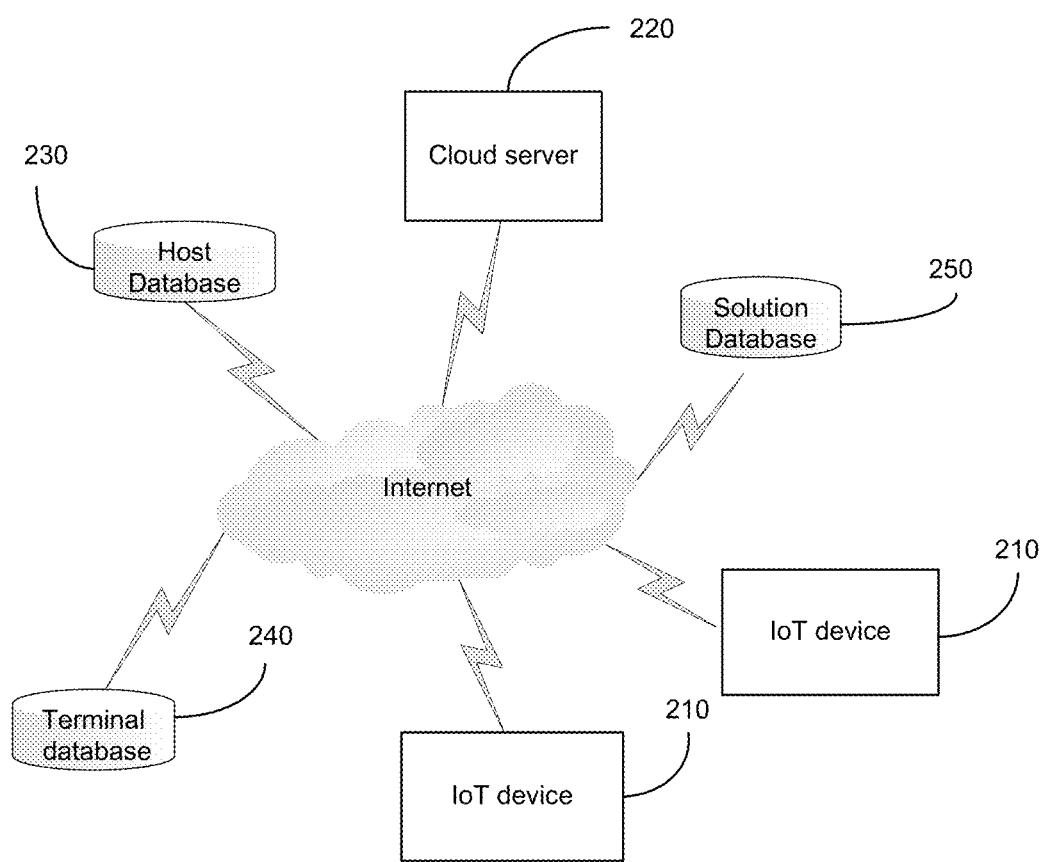
FIG. 2 illustrates a block diagram of an exemplary IoT device management system that automatically monitors and dynamically reacts for events, according to various implementations of the disclosure.

FIG. 2 illustrates a block diagram of an exemplary IoT device management system that automatically monitors and dynamically reacts for events, according to various implementations of the disclosure. The IoT device management method 100 depicted above can be carried out using the configurations illustrated in the FIG. 2. In the IoT device management system 200, the IoT devices 210, which include information sensing devices and application devices, are connected to a cloud server 220 via the Internet or other communication network to form a network. As mentioned above, the information sensing device can include environmental parameter sensing device, such as, thermometers, humidity sensors, water pressure sensors, air pressure sensors, for example, physiological parameter sensing device, such as, blood-pressure meters, cardiotachometers, thermometers, electrocardiogram meters, oximeter, electroencephalogram sensors, plantar pressure sensors, for example, and any other suitable sensing device, such as, radio frequency identifications (RFID), global positioning systems (GPS), laser scanners, a camera, and a camcorder for example The application devices can include actuators, such as, fans, air conditioners, for example, and any other devices, such as refrigerator, washing machines, sprinkler, light-fixtures, alertor, computers, which can execute some functions.

In some embodiments a host database 230 and a terminal database 240 are also connected to the cloud server 220 via the Internet. The host database 230 stores knowledge data in which knowledge and data can be derived (as data represents values attributed to parameters; and knowledge signifies understanding of real things or abstract concepts). The terminal database 240 stores sensed data obtained by the information sensing devices Furthermore, the cloud server 220 is connected to different solution database 250 via the Internet. The different solution database corresponding to different kinds of events. Each solution database stores a plurality of solutions. In some embodiments, the solution database can include previously taken solutions that successfully solve occurred events, and each of such solutions includes related information, such as, time, location, device, and/or people receiving the solution. Alternatively or additionally, the solution database can include solutions which are predetermined by a user, such as standard operation procedures (SOPs), or created using a model built according to gathered data.

The cloud server 220 can automatically monitor and dynamically react for occurred events using the IoT devices 210 based on data in the host database 230, the terminal database 240, and the solution database 250.

Figure 3:
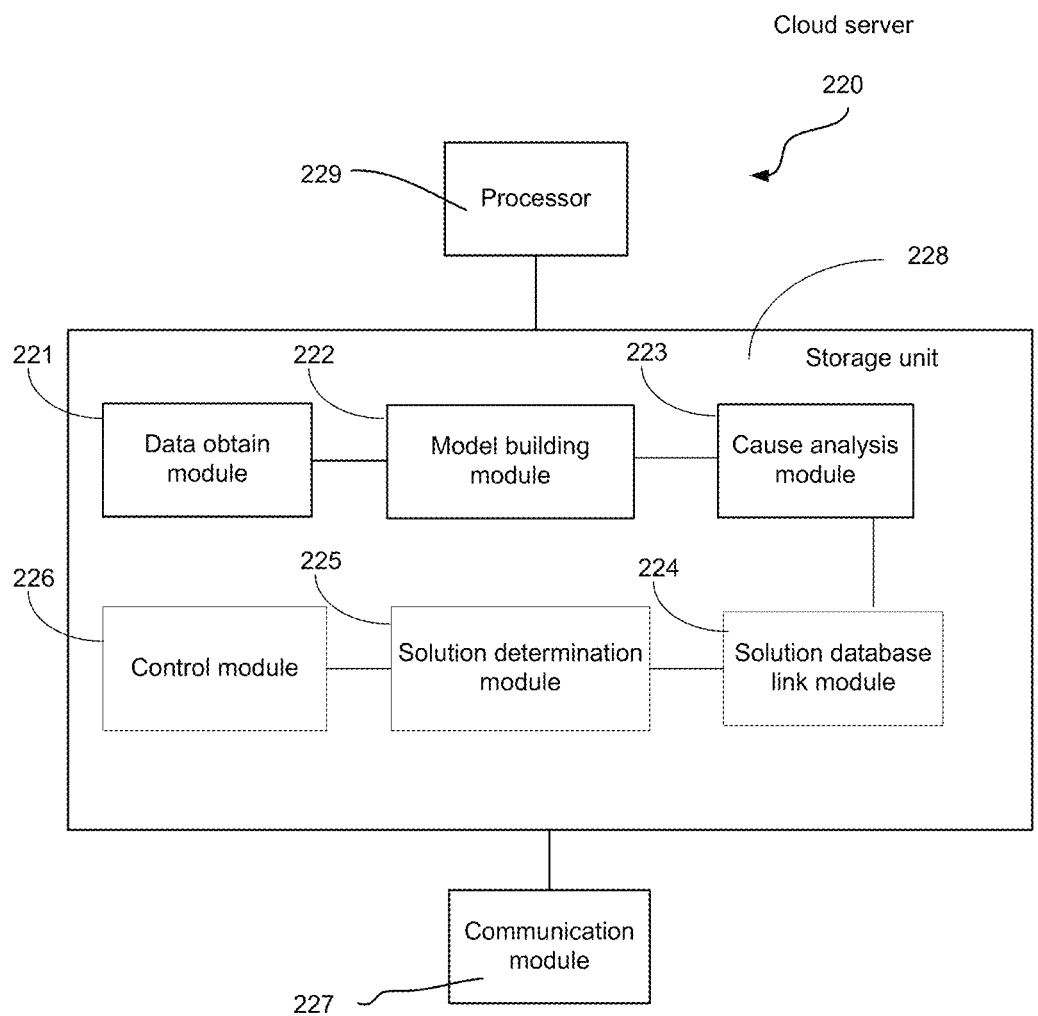
FIG. 3 illustrates a block diagram of function modules of a cloud server which is a control center of the IoT device management system in FIG. 2, according to various implementations of the disclosure.

FIG. 3 illustrates a block diagram of function modules of the cloud server, according to various implementations of the disclosure. The function modules of the cloud server 220 include a data obtaining module 221, a model building module 222, a cause analysis module 223, a solution database link module 224, a solution determination module 225, a control module 226, and a communication module 227.

The word "module" as used hereinafter, refers to logic embedded in hardware or firmware, or to a collection of software instructions, written in a programming language, such as, for example, Java, C, or assembly. One or more software instructions in the function modules can be embedded in firmware. It will be appreciated that the function modules can comprise connected logic units, such as gates and flip-flops, and can comprise programmable units, such as programmable gate arrays or processors. The function modules described herein can be implemented as either software and/or hardware modules and can be stored in a storage unit 228. The storage unit 228 can be any type of non-transitory computer-readable storage medium or other computer storage device. The function modules, when controlled by a processor 229, can execute the functions as follows.

The data obtaining module 221 is configured to gather data upon request or continuously. The gathered data can include sensed data, related information and/or knowledge data of occurred events, and any other useful data. The gathered data can be used to build models to determine whether or not an event occurs, and/or analyze causes of the occurred event. Alternatively or additionally, the gathered data can also be used to build models to create or determine one or more solutions to solve the occurred event.

In some embodiments, the sensed data can be data, such as, measured temperature, captured image, for example, which is sensed by the information sensing device 210. The related information of the occurred event includes time, location, people, and/or device of the event. The sensed data and the related information of the event can be obtained by the data obtaining module 221 from the terminal database 240.

In some embodiments, the data obtaining module 221 generates descriptive language of the occurred event. For example, when the thermometer measures a temperature of a room is 50 degrees C., then, the data obtaining module 221 can generate descriptive language of "high temperature," "raised temperature" or the like. In another example, when a blood-pressure meter measures that a blood-pressure of a person is "180/100 mmHg", the data obtaining module 221 can generates descriptive language of "Hypertension," "HTN" or "high blood pressure." The knowledge data of the occurred event is searched by the data obtaining module 221 from the host database 230 according to the descriptive language.

The model building module 222 is configured to build models according to the gathered data using approach, such as, artificial neural networks (ANN), support vector machines (SVM), and/or regression analysis, for example In one embodiment, the built models can be used to determine whether an event occurs. Alternatively or additionally, the built models can also be used to create or determine solutions to solve occurred events.

The cause analysis module 223 is configured to analyze one or more causes of the occurred event according to the gathered data. For example, if an event is the temperature of a room measured by a thermometer being 100 degrees C., the cause analysis module 223 can analyze that a cause of the event is the room is on fire. In another example, if an event is the temperature of a room measured by a thermometer being 35 degrees C., the cause analysis module 223 can analyze that a cause of the event is an air conditioner in the room is turned down or turned off or is broken.

The solution database link module 224 is configured to link to a solution database corresponding to the occurred event. In some embodiments, there are different solution databases corresponding to different kinds of events. Each solution database stores a plurality of solutions. In some embodiments, the solution database can include previously taken solutions that successfully solve occurred events, and each of such solutions includes related information, such as, time, location, device, and/or people that receive the solution. Alternatively or additionally, the solution database can include solutions which are predetermined by a user, such as a standard operation Procedures (SOPs), or created using a model built according to gathered data.

The solution determination module 225 is configured to determine a solution of the occurred event according to the related information of the occurred event based on the solution database. The solution determination module 225 can compare the related information of the occurred event and the related information of the solutions in the solution database, and determine a proper solution from the solution database. Alternatively, if no proper solution exits in the solution database, the cloud server can create a solution based on the sensed data and/or knowledge data of the occurred event.

The control module 226 is configured to respond to the occurred event according to the determined solution. In some embodiments, the control module 226 controls the IoT devices to solve the occurred event based on the determined solution. For example, the control module 226 controls a sprinkler, whose location is above the fire, to put out a fire, controls to turn up an air conditioner to decrease temperature, for example In some embodiments, the solution determination module 225 is also configured to check an effect of the determined solution by detecting if the same event occurs again in a predetermined time period. The predetermined time period can be different according to different events. If the same event occurs again in the predetermined time period, the determined solution can be improper, or one or more of the IoT devices that are controlled to solve the occurred event are broken down. When the same event occurs again in the predetermined time period, the solution determination module 225 changes another solution or updates the current determined solution. The current determined solution can be updated by repairing or replacing the broken devices.

When the same event does not occur again in the predetermined time period, it is submitted the current determined solution is successful, and the solution determination module 225 is further configured to check if the current determined solution is resourced from the solution database. When the current determined solution is newly created, the solution determination module 225 can store the solution into the solution database, and further store related information of the solution into the solution database. As mentioned above, the related information of the solution includes such as, time, location, device, and/or people receiving the solution.

Figure 4:
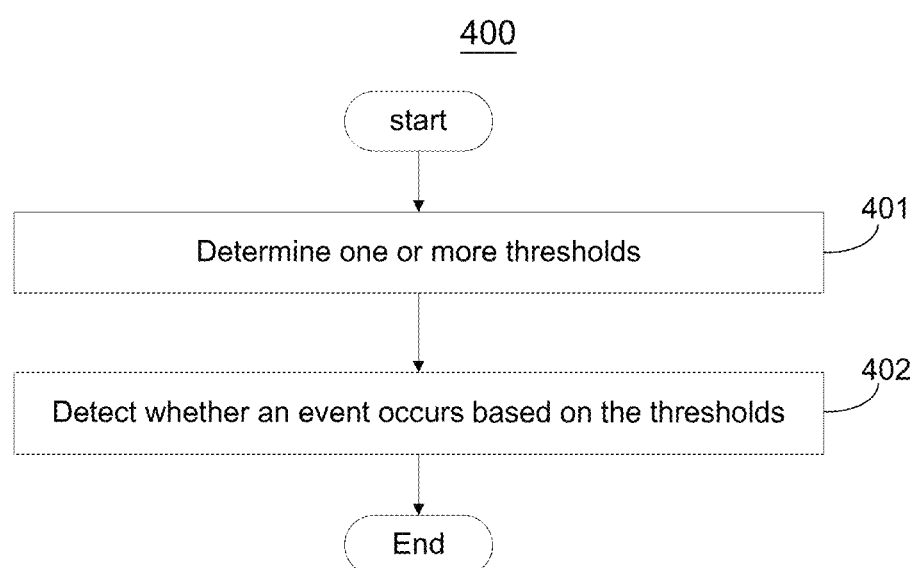
FIG. 4 illustrates a flow chart of a first exemplary method for determining whether an event occurs, according to various implementations of the disclosure.

FIG. 4 illustrates a flow chart of a first exemplary method for determining whether an event occurs, according to various implementations of the disclosure. An exemplary method 400 is provided by way of examples, as there are a variety of ways to carry out the method. Each block shown in FIG. 4 represents one or more processes, methods or subroutines, carried out in the exemplary method 400. Furthermore, the illustrated order of blocks is by example only and the order of the blocks can change according to the present disclosure. Additional blocks may be added or fewer blocks may be utilized, without departing from this disclosure. An exemplary method 400 can begin at block 401.

At block 401, one or more threshold values are determined. For example, a comfortable environmental temperature for one person is 23 to 25 degrees C. Thus, a threshold value of the environmental temperature can be determined from a range of 23 to 25 degrees C.

At block 402, the IoT devices detect whether an event occurs based on the threshold values. For example, when a thermometer measures a temperature of a room is 30 degrees C., which is greater than a threshold value of 25 degrees C., then the cloud server connected to the thermometer can determine that an event occurs.

In some circumstances, the predetermined threshold is not always proper. For example, for different people, the comfortable temperature can be different. Thus, it is better to build a model to determine whether an event occurs dynamically. In one embodiment, the method of building models can be illustrated in FIG. 5 below.

Figure 5:
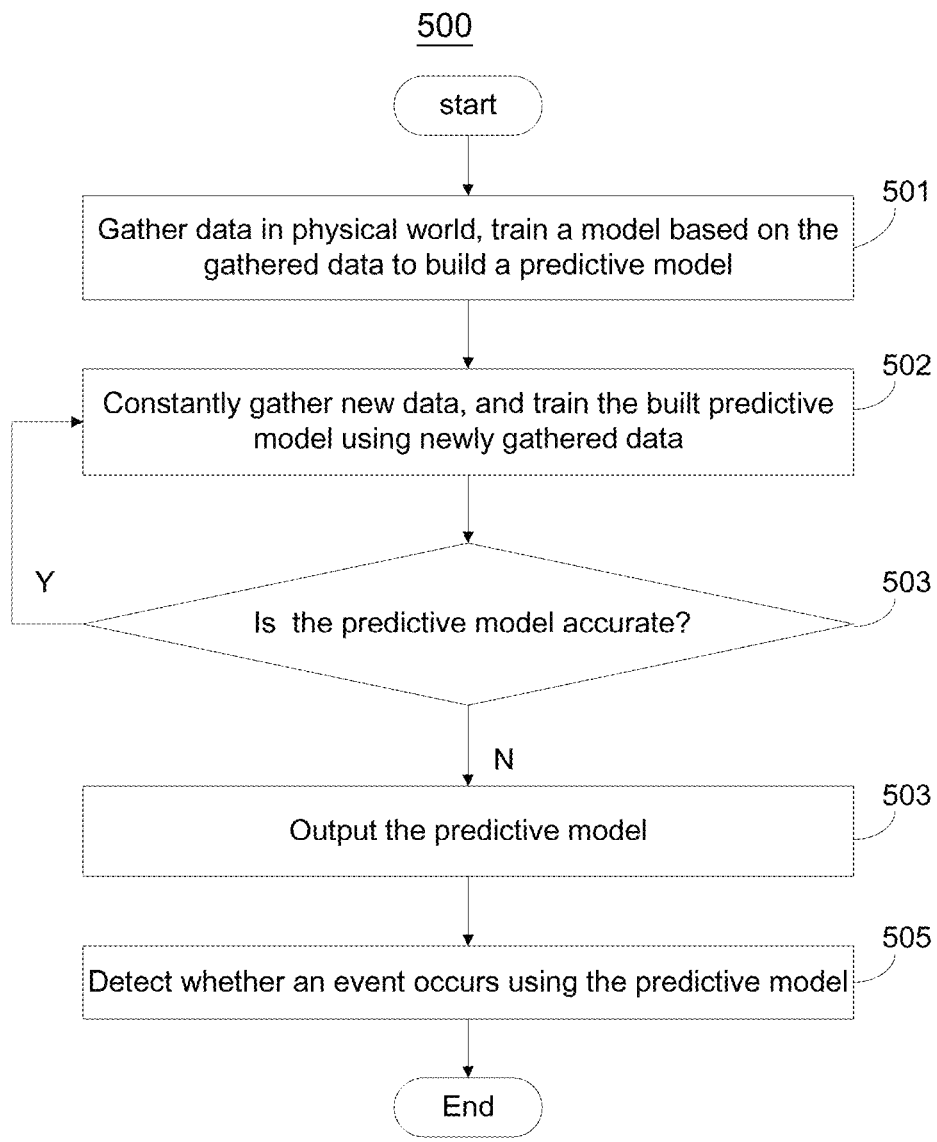
FIG. 5 illustrates a flow chart of a second exemplary method for determining whether an event occurs, according to various implementations of the disclosure.

FIG. 5 illustrates a flow chart of a second exemplary method for determining whether an event occurs, according to various implementations of the disclosure. An exemplary method 500 is provided by way of examples, as there are a variety of ways to carry out the method. Each block shown in FIG. 5 represents one or more processes, methods or subroutines, carried out in the exemplary method 500. Furthermore, the illustrated order of blocks is by example only and the order of the blocks can change according to the present disclosure. Additional blocks may be added or fewer blocks may be utilized, without departing from this disclosure. An exemplary method 500 can begin at block 501.

At block 501, the IoT devices gather data in physical world, and the cloud server designs a model based on the gathered data to build a predictive model. The gathered data can be environmental data, physiological data, or any other data in physical world, such as voltage values, for example. The predictive model is a scientific discipline that explores the construction and study of algorithms that can learn from gathered data. In some embodiments, training model approaches can be artificial neural networks (ANN), deep learning, support vector machines (SVM), and/or regression analysis for example At block 502, the IoT devices gather new data constantly, and design the built predictive model using the new gathered data. In some embodiments, the new data can be gathered by expanding data gather ranges in time, places, people, and/or objects. For example, an original data gather range is in a house, and the expanded data gather range can be in a town where the house is located. Alternatively or additionally, the new gathered data can be gathered by increasing additional devices, such as increasing one or more additional information sensing devices. Alternatively or additionally, the new data can also be gathered by increasing sample frequency. One skilled in the art can also use other methods to gather the new data, but not limit the method as described above.

At block 503, the cloud server determines whether the predictive model is accurate, after adding the new gathered data, according to a variation of data output of the predictive model and a predetermined threshold value. When the predictive model is inaccurate, block 205 is repeated to add new data into the predictive model. Otherwise, when the predictive model is accurate, block 503 is implemented to output the predictive model.

At block 504, the cloud server determines whether an event occurs using the predictive model. The cloud server can input data obtained by the IoT devices to the predictive model, and determine whether an event occurs according to an output of the predictive model.

In some embodiments, the above depicted predictive model can be built using a single-input and single-output (SISO) system. SISO system is typically used since it is less complicated.

In some embodiments, multi-variable models can be built, to create and determine one or more solutions to solve the occurred event. By facilitating the predictive models generated by data including causes and effectiveness of selected solutions, the solution determination module 225 can also execute a set of procedures to solve the occurred event. These procedures can come from multiple predetermined solutions of different events and be combined as multiple-input and evaluated by some parameters as single-output or multiple-output (MISO or MIMO).

Figure 6:
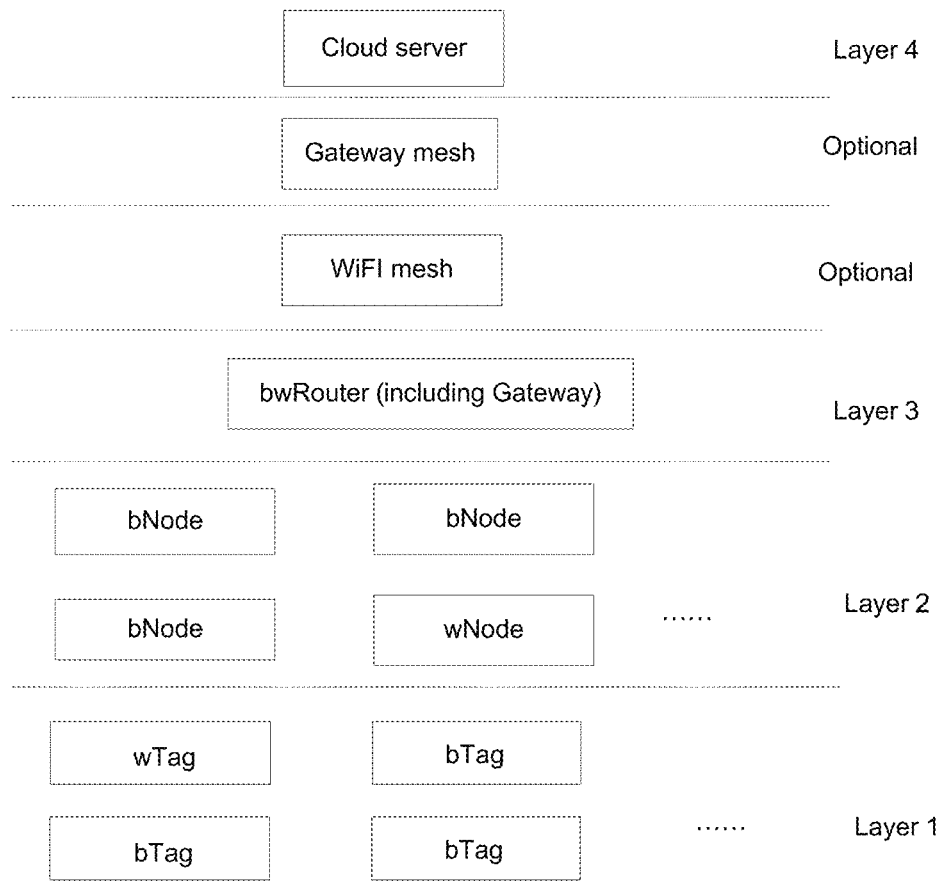
FIG. 6 illustrates a block diagram of exemplary network architecture of the IoT device management method and system, according to various implementations of the disclosure.

For improving accurateness of the predictive models, efficient network architecture for gathering data can be constructed as FIG. 6.

FIG. 6 illustrates a block diagram of exemplary network architecture of the IoT device management system and method, according to various implementations of the disclosure.

In some embodiments, the network architecture can include five layers. Layer 1 is a tag layer, layer 2 is a node layer, layer 3 is a router layer, and layer 4 is a cloud layer. Between layer 3 and 4 there are optional layers of Wi-Fi mesh and gateway mesh which provides a larger networking range.

In some embodiments, the tag layer can include, but is not limited to, BLUETOOTH modules (bTag) and/or Wi-Fi modules (wTag). The bTag and wTag can be alone, or be attached on or coupled to any movable IoT devices, such as mobile phones, portable computers, cameras, camcorders, for example which are portable and/or wearable by people or animals. It should be noticed that either bTag or wTag can be regarded as a terminal device or an IoT device.

In some embodiments, the node layer can include, but is not limited to, devices (bNode) and/or Wi-Fi device (wNode). The bNode or wNode include fixed IoT devices which are coupled with or attached with BLUETOOTH modules or Wi-Fi modules. The fixed IoT devices have fixed coordinate locations which can be used for locating mobile tags, and can include air conditioners, refrigerators, washing machines, sprinklers, light-fixtures, for example In some embodiments, the router layer includes computers, and/or any other devices or systems which have computing capacity, large bandwidth, and storage space. The router layer communicates with the tag level and the node level to form a sub-network in a certain region, such as, a home network or a small office network. The router layer can be an agent control center of the sub-network. The computers, and/or any other devices or systems in the router layer can include a Wi-Fi interface and/or a BLUETOOTH interface (also called bwRouter). Thus, data can be obtained from the tag layer and the node layer, and transmitted to the tag layer and the node layer. It should be noticed that there may be wRouter or wGateway which only have WiFi function in this layer. In some embodiments, the router layer can temporarily store the data obtained from the tag layer and the node layer.

A gateway device can be incorporated to the bwRouter or as an independent device bridging the bwRouter and the Cloud Server. The gateway device is a network node equipped for interfacing with another network that uses different protocols. The gateway device can include modules such as protocol translators, impedance matching devices, rate converters, fault isolators, or signal translators as necessary to provide system interoperability.

There can be optional layers, Wi-Fi Mesh and Gateway Mesh, between the bwRouter and the Cloud Server. The Wi-Fi mesh is used to increase the coverage area of each Cloud Server; for example, Wi-Fi stations from different flats/offices in a same building can be inter-connected and linked to the Cloud Server using the Gateway Mesh. Here is not limited to Wi-Fi communication but including GSM or other potential protocol.

In some embodiments, the cloud layer can include a cloud server, which is the control center that controls and manages all the IoT devices. The cloud server can include the components depicted in FIG. 3.

It should be noticed that the exemplary network architecture in FIG. 6 can be a location-based network system. During the installation process, it is important to install or dispose the switch nodes (e.g., bwRouter, wRouter or wGateway) and the communication nodes (e.g., bNode and/or wNode) at fixed geographic locations. Namely, the switch nodes and the communication nodes are installed or disposed at fixed longitudes, latitudes, and altitudes. During the installation process, the longitudes, latitudes, and heights of the switch nodes and those of the communication nodes are set up in the hardware respectively. In addition, the communication node is able to record the longitudes, latitudes, and heights of the neighboring switch nodes. Also, the latitude and longitude of the switch node or the communication node may be set up by using a built-in global positioning system (GPS) module.

In some embodiments, one of the communication nodes can be destination node, and the data packet can be transmitted according to the distance between the latitude, longitude, and altitude of each of the communication nodes and that of the destination node. By utilizing the above distance information, the location-based network system can form a mesh network with routing that propagates the data packets along a path by hopping from node to node until the packets reach the destination, thus increasing the deliverability rate of the data packets. To ensure all path availability, the mesh network allows for continuous connections and reconfigures itself around broken paths by using self-healing algorithms such as shortest path bridging.

The switch nodes (e.g., bwRouter, wRouter or wGateway) and the communication nodes (e.g., bNode and/or wNode) can be respectively installed on a plurality of facilities or a plurality of landmarks that have fixed locations. For example, the facilities may be indoor lighting apparatuses, street lights, traffic lights, home appliances or the like, and the landmarks may be railings, bulletin boards or the like. It should be noticed that the embodiments of the invention are not limited to the above. For example, the switch nodes and the communication nodes may be integrated with light emitting diodes (LED) to be disposed in indoor lighting apparatuses or street lights. On the other hand, the communication nodes may be a standalone communication module powered by a battery.

The above depicted IoT device management method, system, and network architecture can be used in, such as, a family environment, to monitor and react to events in the family environment. An example is given below in FIG. 7.

Figure 7:
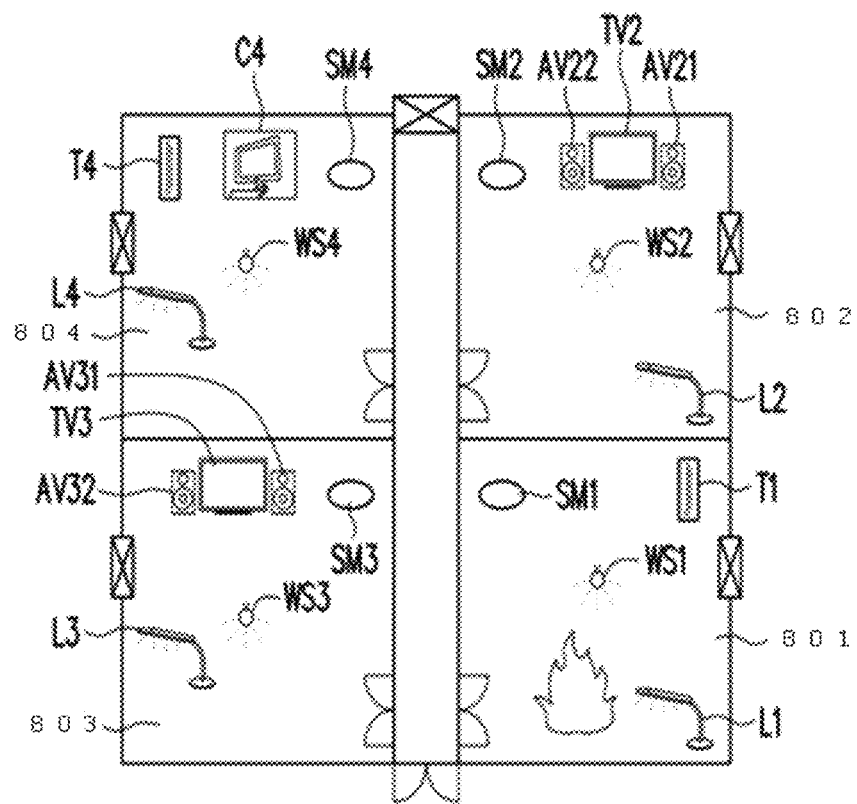
FIG. 7 illustrates an example of automatically monitoring and dynamically reacting for a fire situation, according to various implementations of the disclosure.

FIG. 7 illustrates an example of automatically monitoring and dynamically reacting for a fire situation, according to various implementations of the disclosure.

In the example illustrated in FIG. 7, a house has four rooms, respectively are room 801, room 802, room 803, and room 804. Each room has a plurality of information sensing devices and application devices. The information sensing devices include smoke detectors SM1 to SM4, and thermometers T1 and T4. The application devices include sprinklers WS1 to WS4, televisions TV 2 and TV 3, audios AU21 to AU22, and AU31 to AU 32, light-fixtures L1 to L4, and computer C4.

When an information sensing device detects that an event occurs, for example, the smoke detector SM1 detects smoke in room 801, the computer C4 can obtain sensed data, related information and/or knowledge data of the occurred event. The related information can include location of the smoke detector SM1, time of detecting the smoke, type of the smoke detector SM1, for example. The computer C4 obtains related sensed data according to the related information from a terminal database, such as, obtaining temperature sensed by the thermometers T1 near the smoke detector SM1. The computer C4 can further generate descriptive language of the occurred event, and obtain related knowledge data of the occurred event from a host database according to the descriptive language.

The computer C4 can analyze one or more causes of the occurred event according to the related information, the sensed data and the knowledge data. For example, if the temperature sensed by the thermometers T1 is normal, the computer C4 can analyze that the smoke can be caused by a person cooking or smoking, but not by fire. In another example, if the temperature sensed by the thermometers T1 is abnormal, for example the temperature is higher than a preset threshold value, the computer C4 can analyze that the smoke can be caused by fire.

After analyzing the causes, the computer C4 can link to a corresponding solution database, and determine a solution of the occurred event from the solution database. For example, after analyzing the cause of the smoke is fire, the computer C4 can link to a solution database about how to put out a fire. According to the related information, the sensed data, and/or the knowledge data of the occurred event, the computer C4 can determine a solution from the solution database. For example, the solutions to put out a fire recorded in the solution database include using water, foam, for example. When it is determined that no people are in the room 401 according to the sensed data, the computer C4 can determine to put out the fire using foam. In another example, when it is determined that there is a person in the room 401, and the person is sleeping, the computer C4 can determine to sound alarm at the same time, although all the solutions in the solution database do not include an alarm solution.

The above depicted IoT device management method, system, and network architecture not only can be used in a family environment, but also can be used in a social environment, such as in a city, to monitor and react for events in the city. Two examples are given below in FIG. 8.

Figure 8:
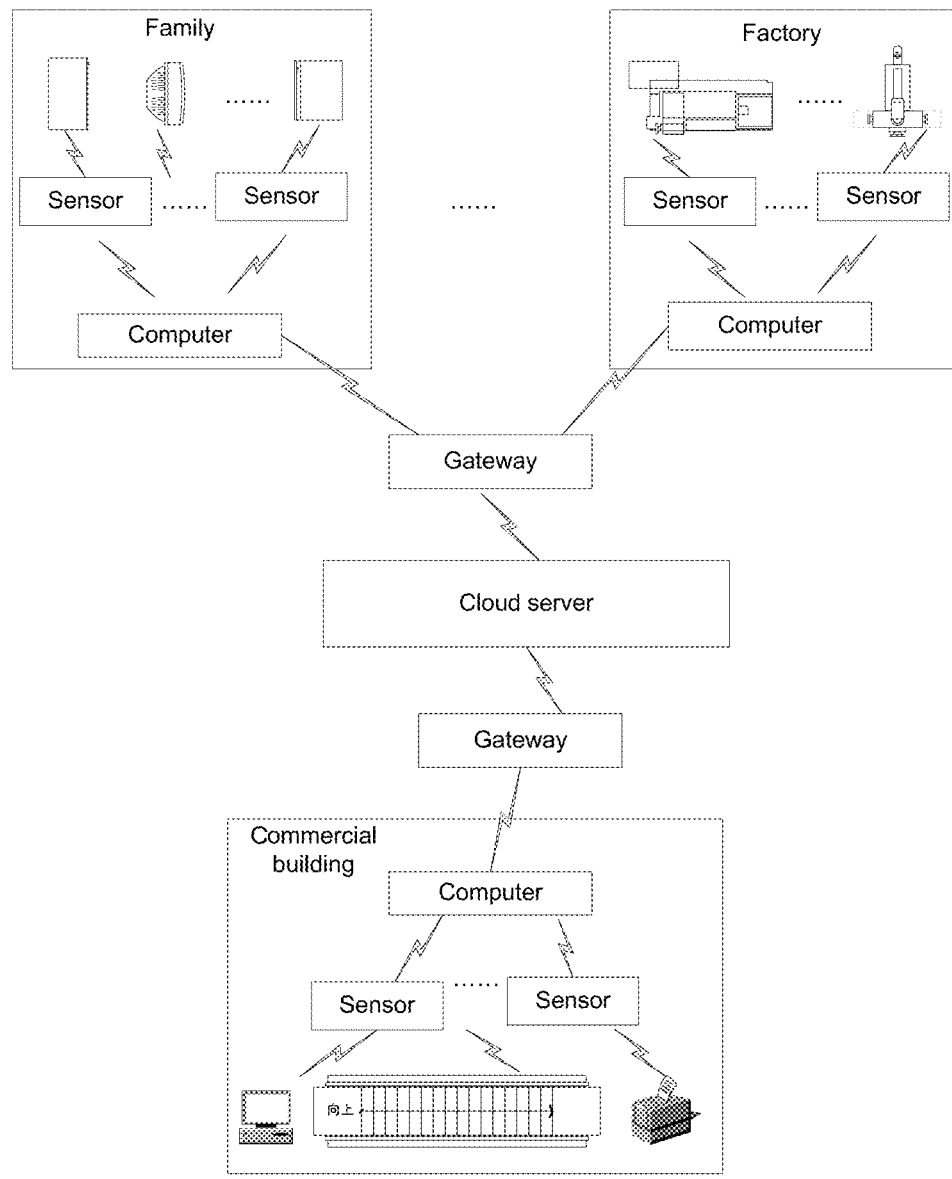
FIG. 8 illustrates a first example of automatically monitoring and dynamically reacting to electric energy consumption in a region, according to various implementations of the disclosure.

FIG. 8 illustrates an example of automatically monitoring and dynamically reacting electric energy consumption in a region, such as a community or a city, according to various implementations of the disclosure.

Electric and electronic devices consume electric energy to generate desired output (i.e. light, heat, motion, for example). Electric energy consumption and electricity supply are not always constant. For example, the power generated by solar panels or windmills depends on the weather which varies a lot. Also, the power consumption is also different during a day based on the habits of a user. Thus, predicting electricity supply in a region, such as a community or a city, is important to have a balanced distribution of electricity.

In the example illustrated in FIG. 8, each family, factory, commercial building, for example in a city, can include application devices, such as televisions, refrigerators, washing machines, elevators, light-fixtures, machine tools, for example Such application devices need to consume electric energy. Information sensing devices, such as voltmeters, can be used to measure sensed data, such as volt values, of the application devices. In some embodiments, the information sensing device can measure the sensed data constantly, at each predetermined time period, or at one or more fixed time points.

Computers and/or any other devices or systems, in each family, factory, commercial building, for example, can constantly gather the sensed data or any other usefully data, and transmit the gathered data to a cloud server. The cloud server can build a predictive model using the constantly gathered data. According to the predictive model, electric energy consumption in the city can be predicted, such as, when the peak time of the electric energy consumption, and whether the electric energy during the peak can be supplied adequately by electric power plants in the city. In one embodiment, when the electric energy in the peak cannot be supplied adequately by the electric power plants in the city, another predictive model can be built to determine a solution, such as, increasing one or more electric power plants in the city, for example.

Figure 9:
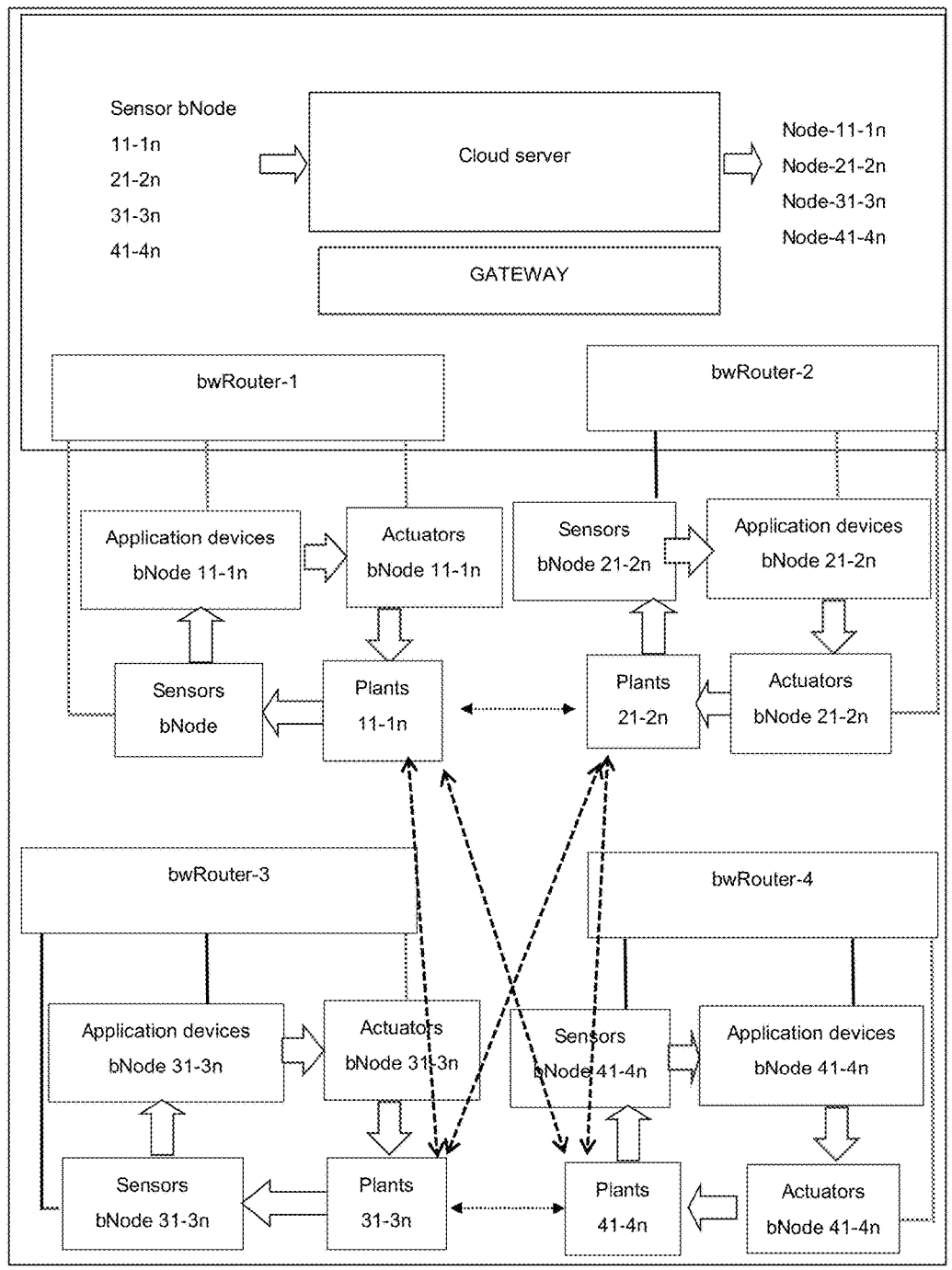
FIG. 9 illustrates a second example of automatically monitoring and dynamically reacting to electric energy consumption in a region, according to various implementations of the disclosure.

In addition, the example illustrated in FIG. 8 can be expanded, such as illustrated in FIG. 9. In FIG. 9, data about electric energy consumption in more than one region, such as more than one community or city, is gathered. One or more predictive model of electric energy consumption for each city can be built. When it is predicted that the electric energy in community A cannot be supplied adequately, one or more electric power plants in community B can be used to supplement the lack of electric energy in the community A. The power grid is designed to have a balanced distribution of the power generated for the non-uniform power consumption.

Figure 10:
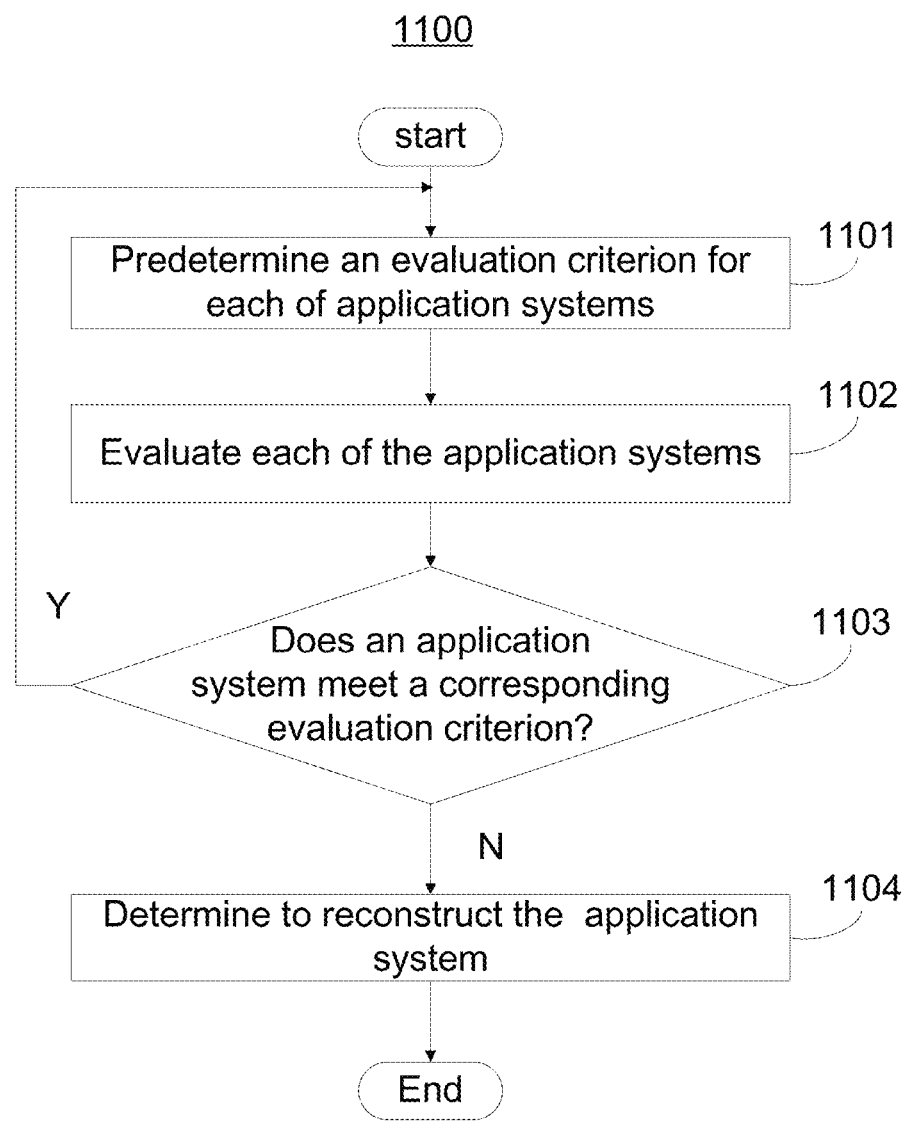
FIG. 10 illustrates a flowchart of an IoT device management method for automatically monitoring application systems, according to various implementations of the disclosure.

FIG. 10 illustrates a flowchart of an IoT device management method for automatically monitoring application systems, according to various implementations of the disclosure. The example method 1100 is provided by way of examples, as there are a variety of ways to carry out the method. Each block shown in FIG. 10 represents one or more processes, methods or subroutines, carried out in the exemplary method 1100. Furthermore, the illustrated order of blocks is by example only and the order of the blocks can change according to the present disclosure. Additional blocks can be added or fewer blocks can be utilized, without departing from this disclosure. The exemplary method 1100 can begin at block 1101.

At block 1101, a control center, which is able to control and manage all the IoT devices, predetermines an evaluation criterion for each application system. For example, a comfortable temperature in a room for people is 21° C. to 24° C., thus, a task of a room temperature control system is controlling the temperature in the room to be a value between 21° C. to 24° C. Thus, the evaluation criterion, of the room temperature control system, is that the temperature has to be within a region of 21° C. to 24° C. In another example, the evaluation criterion can be running times, operation conditions, for example, of the IoT devices in the application systems. For example, the evaluation criterion can be a CPU occupancy rate, a power consumption limit, or an upper limit of connecting devices, and so on.

At block 1102, the control center evaluates each of the application systems. In some embodiments, the control center can evaluate each of the application systems according to data obtained from the IoT devices and the corresponding evaluation criterion. For example, the control center can evaluate the room temperature control system according to temperatures sensed by one or more thermometers. Alternatively, the control center can evaluate each of the application systems by simulation analysis, namely, obtaining predictive temperatures at places without or with broken thermometers by sensed data from other places.

At block 1103, the control center determines whether there is any application system which does not meet the corresponding evaluation criterion. For example, when one or more thermometers in the room temperature control system detects that a temperature of the room is 28° C., which is beyond the evaluation criterion of 21° C. to 24° C., the control center can determine that the room temperature control system does not meet the corresponding evaluation criterion.

At block 1104, the control center determines to reconstruct the application system which does not meet the corresponding evaluation criterion.

Figure 11:
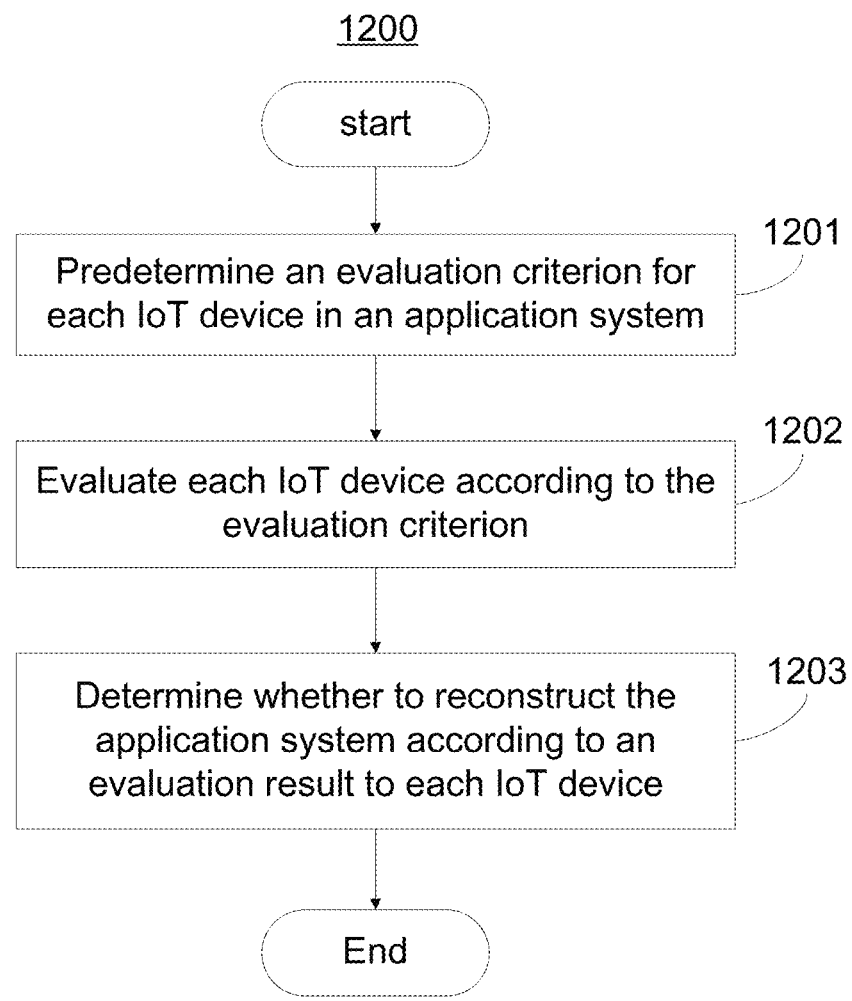
FIG. 11 illustrates a flowchart of an IoT device self-evaluation method, according to various implementations of the disclosure.

In some embodiments, when the application system does not meet the corresponding evaluation criterion, the application system can self-evaluate and self-adjust first, to meet the corresponding evaluation criterion. An example of an IoT device self-evaluation method is illustrated in FIG. 11.

An exemplary method 1200 of the IoT device self-evaluation for an application system can begin at block 1201, at which, the application system predetermines an evaluation criterion for each IoT device in the application system. At block 1202, the application system evaluates each IoT device according to the evaluation criterion, and at block 1203, the application system determines whether to reconstruct the application system according to an evaluation result to each IoT device.

In case the application system still cannot meet the corresponding evaluation criterion after adjusting, the control center can determine to reconstruct the application system.

In some embodiments, the application system does not meet the corresponding evaluation criterion when the IoT devices in the application system are lack of capacity. For example, there are two air conditioners in a room. The two air conditioners can control a temperature of the room to a value between 21° C. to 24° C. For some reason, the two air conditioners may be not enough to control a temperature of the room to a value between 21° C. to 24° C. For example, there is a conference held in the room, and there are a lot of people attending the conference. Alternatively or additionally, a cause of the application system not meeting the corresponding evaluation criterion can be one or more devices, such as the IoT devices, control devices or network devices, in the application broken. For instance, in the example above, one of the two air conditioners is broken.

Figure 12:
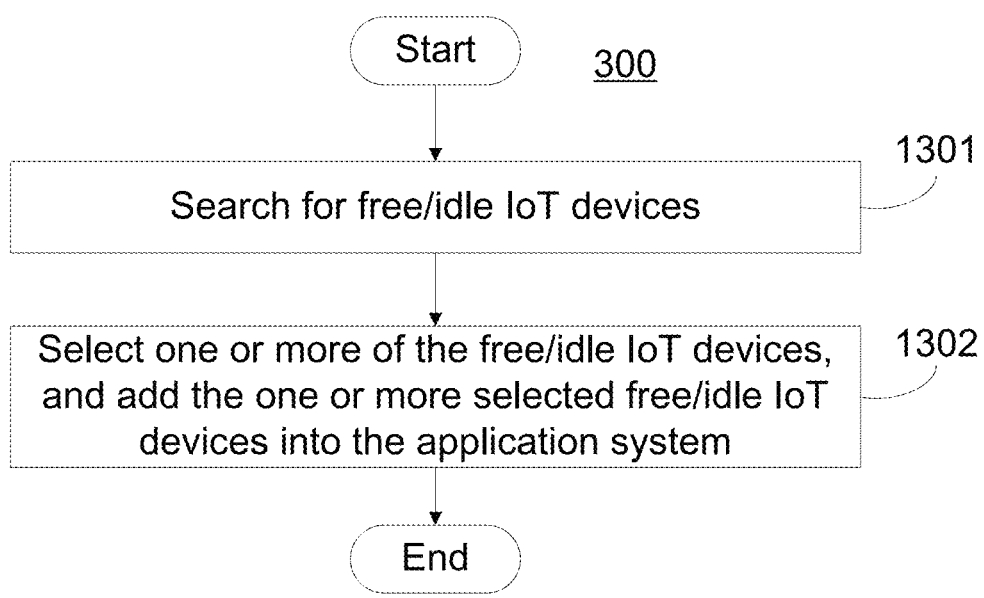
FIGS. 12 and 13 illustrate flowcharts of an IoT device management method for dynamically reconstructing application systems, according to various implementations of the disclosure.

The control center can analyze the cause why the application system does not meet the corresponding evaluation criterion. When the cause is the IoT devices in the application system are insufficient capacity, steps in block 1301 to block 1302 depicted below in FIG. 12 are implemented. The reason for insufficient capacity may be broken devices or an unexpected need. When the cause is that one or more devices in the application is broken, steps in block 1401 to block 1405 depicted below in FIG. 13 can be further implemented together with a preinstalled simulating/modeling management system.

Referring to FIG. 12, at block 1301, the control center searches for one or more free/idle IoT devices. The free/idle IoT devices can include IoT devices which do not belong to any application system and/or idle IoT devices in other application systems. In some embodiments, the control center can also obtain related information of the free/idle IoT devices, such as, locations, working times, types, owners of the free IoT devices.

At block 1302, the control center selects one or more of the free/idle IoT devices, and takes the one or more selected free/idle IoT devices into the application system according to the related information of the free/idle IoT devices. In some embodiments, the related information of the one or more selected free/idle IoT devices needs to partially match with the IoT devices in the application system. For example, the IoT devices, such as air conditioners, in the application system are all located in a specific room, it is better that the selected free/idle IoT devices that are taken into the application system are also located in the specific room. Alternatively, the portable air conditioners in the other room are moved or relocated to the specific room. These air conditioners can also move on wheels or belts and the corresponding movement can be automatically controlled by the control center according to indoor positioning information from sensing devices acting as nodes. The reconstruction of an air conditioning system can also include the dynamic measurement of the temperature distribution of the specific room and determine air flow direction of the fans and the air conditioners to the hot spot.

In some embodiments, the control center can evaluate each of the searched free IoT devices, and select one or more free IoT devices which can be taken into the application system.

Figure 13:
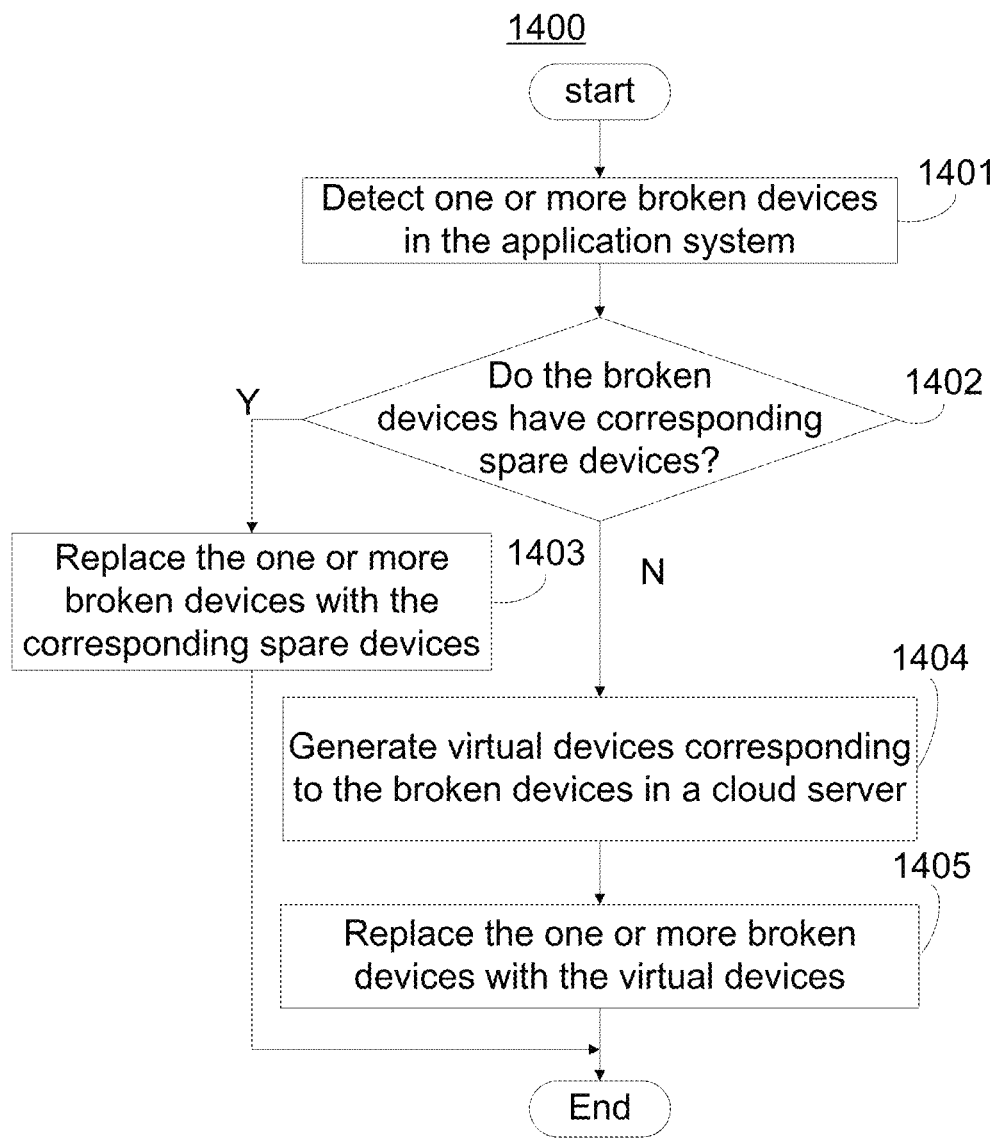

Referring to FIG. 13, at block 1401, the control center detects one or more broken devices in the application system. In one embodiment, when the control center cannot receive any data or feedback from one or more devices in the application system, the control center can determine that the one or more devices are broken. In some embodiments, a broken device can indicate that the device itself is broken and/or connections between the device and other devices are broken.

At block 1402, the control center checks whether the one or more broken devices have corresponding spare devices. As mentioned above, the broken devices can include IoT devices, such as an air conditioner, a thermometer, for example, control devices, such as a computer or a router which is a control center of a sub-network in a certain region, or network devices, such as a Wi-Fi communication device or a BLUETOOTH communication device. When the one or more broken devices have corresponding spare devices, block 1403 is implemented to replace the one or more broken devices with the spare devices. When the one or more broken devices have no spare devices, block 1404 is implemented.

At block 1404, the control center generates virtual devices corresponding to the broken devices in a cloud server.

Figure 14A:
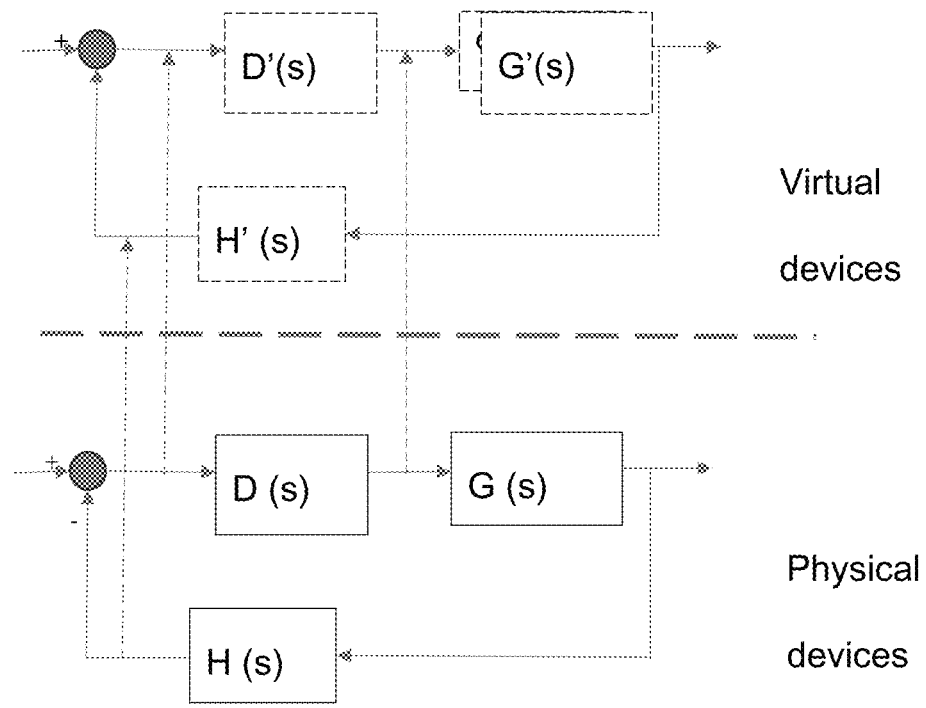
FIGS. 14*a* to 14*d* illustrate block diagrams of an exemplary method for replacing a broken device with a virtual device.
Figure 14B:
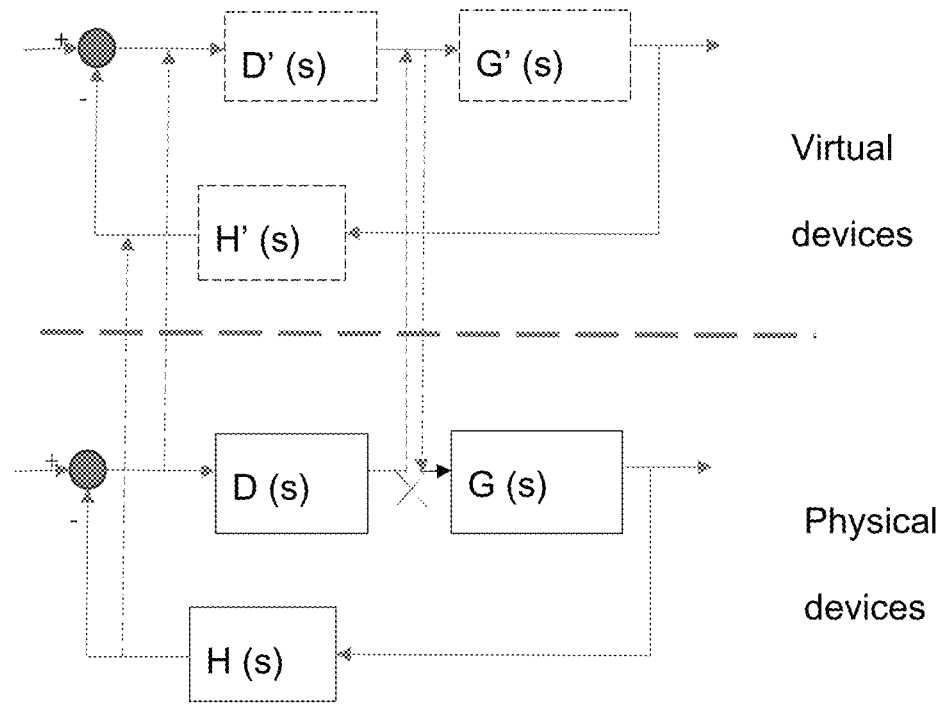
Figure 14C:
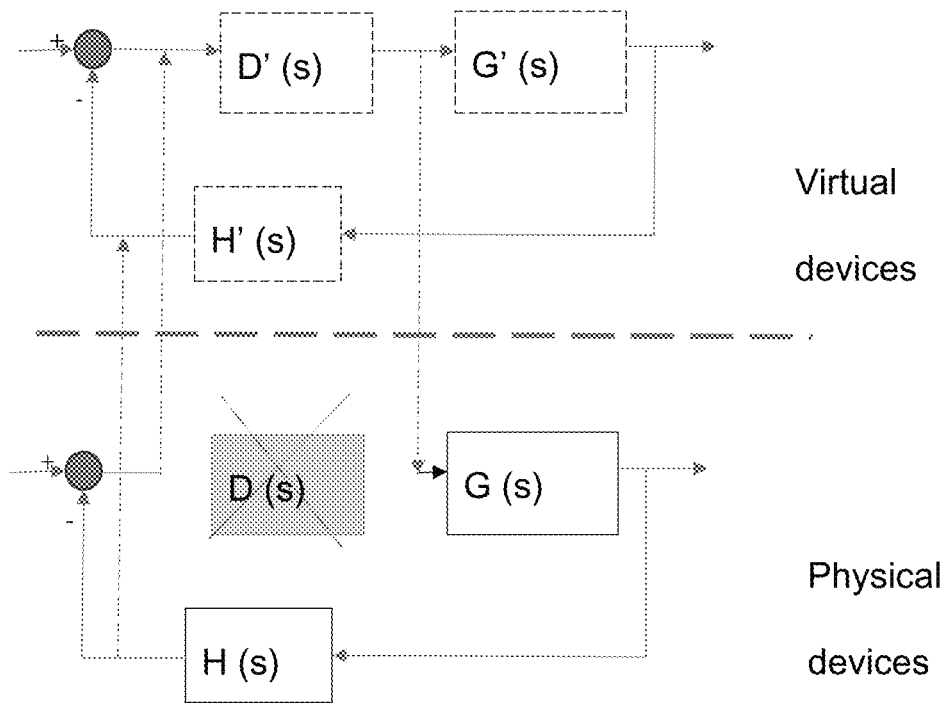

At block 1405, the control center replaces the one or more broken devices with the virtual devices. Referring to FIG. 14a, each physical device can map (see the dotted lines) to a virtual device in the cloud server. When a physical device is broken, such as connections between the physical device and other physical devices are broken (see the example illustrated in FIG. 14b), and/or the physical device itself is broken (see the examples illustrated in FIGS. 14c and 14d), the control center can replace the broken device with the corresponding virtual device. The virtual devices are generated by simulation and modeling of previous data. More specifically, the input/output of each physical device are monitored over time and the recorded data are analyzed to have a model, which provides simulated input/output for virtual devices to keep the feedback loop working when any of the physical devices is broken. For example, when the connection between the sensor (D) and the controller (H) is broken as depicted in FIG. 14b, the sensed data will be sent to the virtual controller (H1) which provides a simulated output using the data as input based on the model for the controller. For example, when the sensor (D) is broken as depicted in FIG. 14c, the virtual sensor (D1) can generate simulated sensing data as an input to the physical controller (H) to keep giving feedback; an error message is also sent to the system manager and thus saves time for repairing and enhances system stability.

Figure 15:
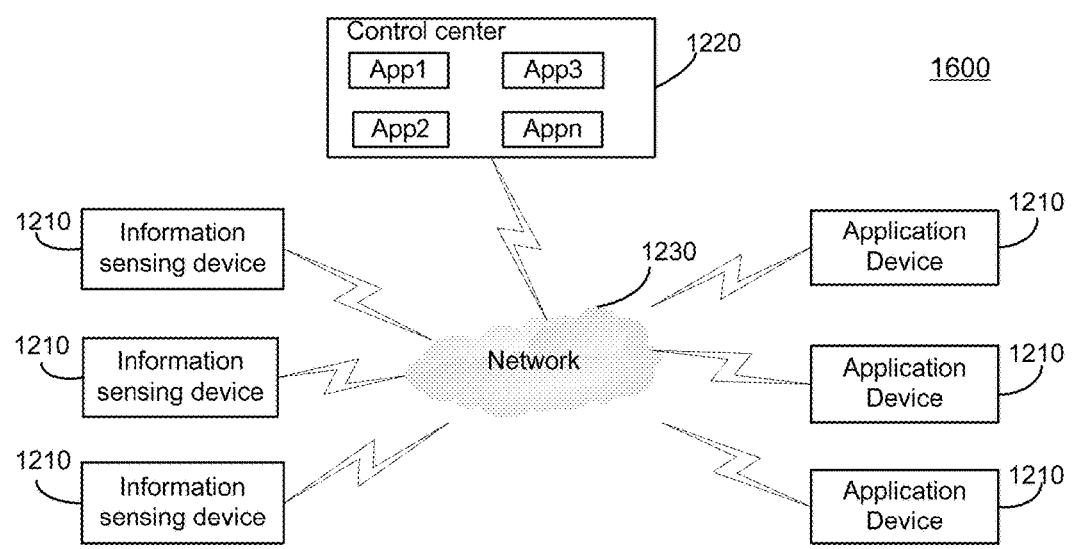
FIGS. 15 and 16*a*-16*b* illustrate block diagrams of an IoT device management system for automatically monitoring and dynamically reconstructing application systems, according to various implementations of the disclosure.
Figure 16A:
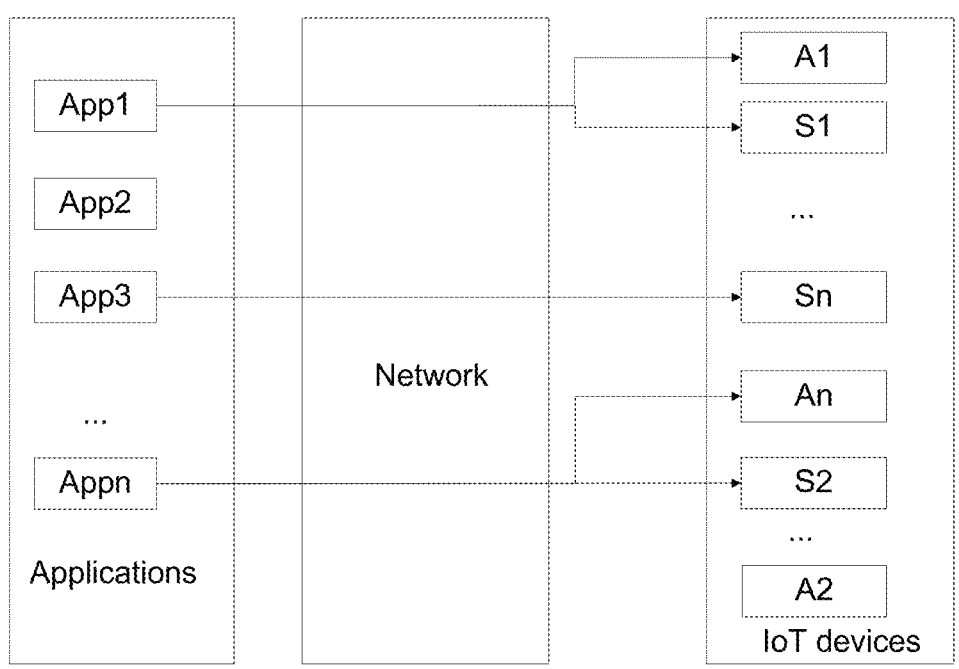
Figure 16B:
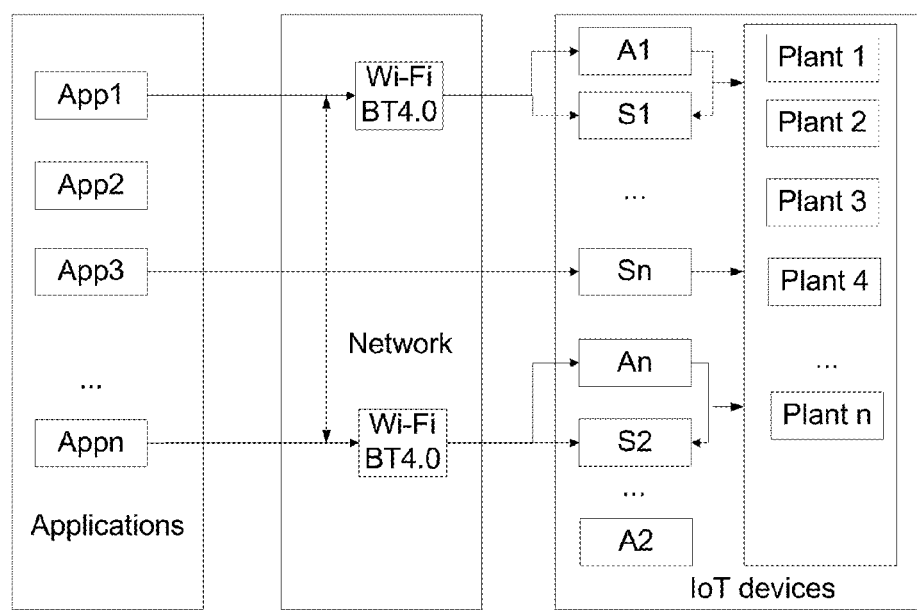

FIGS. 15 and 16a-16b illustrate block diagrams of an exemplary IoT device management system that automatically monitors and dynamically reconstructs application systems, according to various implementations of the disclosure. The IoT device management method 1100 depicted above can be carried out using the configurations illustrated in the FIGS. 15 and 16a-16b. Referring to FIG. 15, in the IoT device management system 1600, the IoT devices, which include information sensing devices 1210 and application devices 1210, are connected to a control center 1220 via a network 1230. The information sensing device 1210 can include environmental parameter sensing device, such as, thermometers, humidity sensors, water pressure sensors, air pressure sensors, for example, physiological parameter sensing device, such as, blood-pressure/blood oxygen saturation meters, cardiotachometers, thermometers, electrocardiogram meters, oximeter, electroencephalogram sensors, plantar pressure sensors, for example, and any other suitable sensing device, such as, radio frequency identifications (RFID), global positioning systems (GPS), laser scanners, a camera, and a camcorder for example. The application devices 1210 can include actuators, such as, fans, air conditioners, for example, and any other devices, such as refrigerators, washing machines, sprinklers, light-fixtures, alarm devices, computers, which are not only for sensing data, but also can execute particular functions.

The network 1230 can be the Internet between organizations, or an intranet that uses Wi-Fi technology or BLUETOOTH technology to exchange data within an organization. When the network 1230 is the Internet, the control center 1220 can include a cloud server that has cloud computing ability. When the network 1230 is an intranet, the control center 1220 can include routers, computers and/or any other devices or systems which have computing capacity. In addition, the infrastructure of the network 1230 can be referred to the exemplary network architecture in FIG. 6.

The control center 1220 is installed with one or more applications, such as, App1, App2, App3, and/or Appn. Each of the applications includes a set of one or more programs designed to carry out operations for a specific application. An application and one or more IoT devices can compose an application system, in which the application can controls the IoT devices to perform tasks that benefit users. Referring to the example illustrated in FIG. 16a, a first application system includes an application App1 and IoT devices including an application device A1 and an information sensing device S1, a second application system includes an application App3 and an IoT device including an information sensing device Sn, and a third application system includes an application Appn and IoT devices including an application device An and an information sensing device S2. Referring to 16b, the network can include a Wi-Fi network, and the application system can be electric energy control system applied to plants.

The control center 1220 can automatically monitor and dynamically reconstruct the application systems, such as adding additional IoT devices into one of the application systems, and/or removing idle, redundant or broken IoT devices from the application system, for enabling tasks performed by each of the application systems meeting a predetermined evaluation criterion. Alternatively or additionally, the reconstruction of an application system can include reassigning or regrouping or reconfiguring IoT devices which have finished missions into a new mission from the application system.

Figure 17:
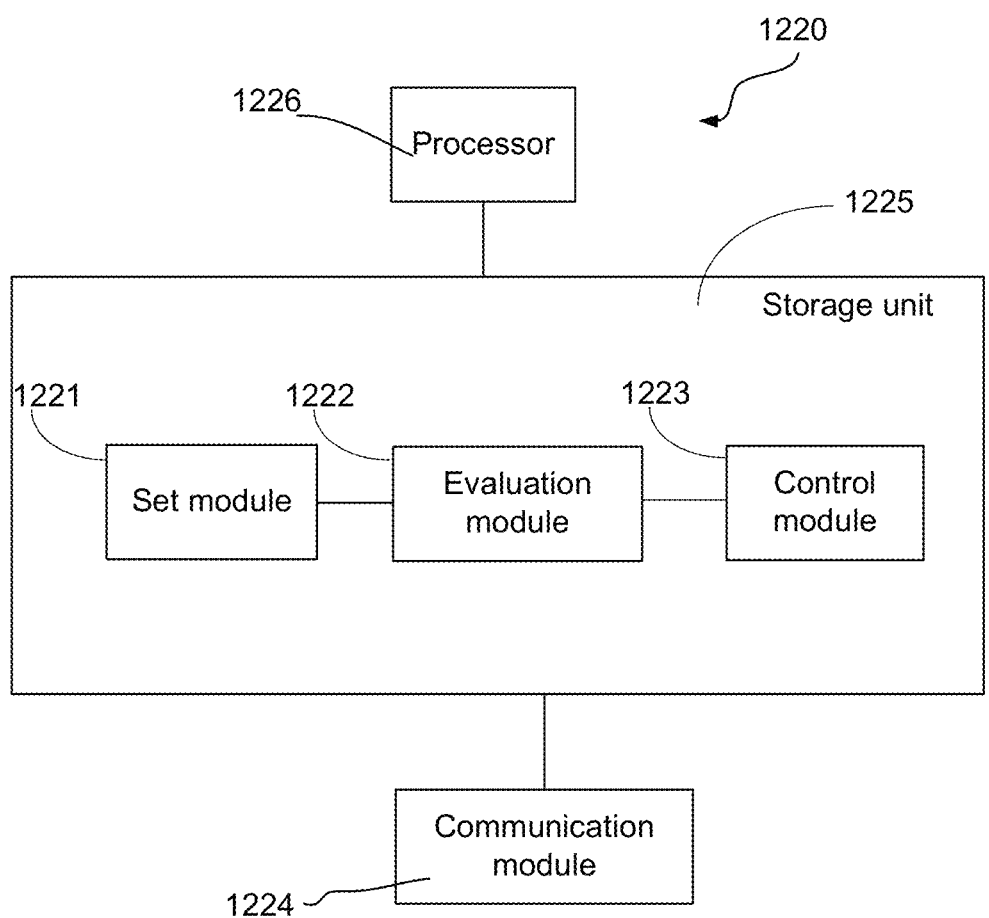
FIG. 17 illustrates a block diagram of function modules of a control center of the IoT device management system, according to various implementations of the disclosure.

FIG. 17 illustrates a block diagram of function modules of the control center of the IoT device management system, according to various implementations of the disclosure. The function modules of the control center 1220 include a set module 1221, an evaluation module 1222, a control module 1223, and a communication module 1224.

The word "module" as used hereinafter, refers to logic embodied in hardware or firmware, or to a collection of software instructions, written in a programming language, such as, for example, Java, C, or assembly. One or more software instructions in the function modules can be embedded in firmware. It will be appreciated that the function modules can comprise connected logic units, such as gates and flip-flops, and can comprise programmable units, such as programmable gate arrays or processors. The function modules described herein can be implemented as either software and/or hardware modules and can be stored in a storage unit 1225. The storage unit 1225 can be any type of non-transitory computer-readable storage medium or other computer storage device. The function modules, when controlled by a processor 1226, can execute the functions as follows.

The set module 1221 is configured to predetermine an evaluation criterion for each of application systems, the evaluation criterion can be set by users or obtained by analyzing previous sensing data. For example, a comfortable temperature in a room for people is 21° C. to 24° C., thus, a task of a room temperature control system is controlling the temperature in the room to a value in 21° C. to 24° C. Thus, the set module 1221 can predetermine the evaluation criterion of the room temperature control system to a temperature between 21° C. to 24° C. In another example, the set module 1221 can predetermine about running times, operation conditions, for example, of the IoT devices in the application systems, as the evaluation criterion of the application system.

The evaluation module 1222 is configured to evaluate each of the application systems. In some embodiments, the evaluation module 1222 can evaluate each of the application systems according to data obtained from the IoT devices and the corresponding evaluation criterion. For example, the evaluation module 1222 can evaluate the room temperature control system according to temperatures sensed by one or more thermometers. Alternatively, the evaluation module 1222 can evaluate each of the application systems by simulation analysis.

The evaluation module 1222 is also configured to determine whether there is any application system which does not meet the corresponding evaluation criterion. For example, when one or more thermometers in the room temperature control system detects that a temperature of the room is 28° C., which is beyond the evaluation criterion of 21° C. to 24° C., the evaluation module 1222 can determine that the room temperature control system does not meet the corresponding evaluation criterion.

The control module 1223 is configured to reconstruct the application system which does not meet the corresponding evaluation criterion. In some embodiments, when the application system does not meet the corresponding evaluation criterion, the application system can be adjusted first autonomously or controlled by the control module 1223, to meet the corresponding evaluation criterion. In one case when the application system still cannot meet the corresponding evaluation criterion after adjustment, the control module 1223 can determine to reconstruct the application system.

The control module 1223 reconstructing the application system can include adding additional IoT devices into the application system. The control module 1223 searches for one or more free IoT devices. The free IoT devices can include IoT devices which do not belong to any application system and/or idle IoT devices in other application systems. In some embodiments, the control module 1223 can also obtain related information of the free IoT device, such as, locations, working times, types, owners of the free IoT devices.

The control module 1223 selects one or more of the free IoT devices, and takes the one or more selected free IoT devices into the application system. In some embodiments, the related information of the one or more selected free IoT devices need to partially match with the application system. For example, the IoT devices, such as air conditioners, in the application system are all located in a specific room, it is better that the selected free IoT devices that can be taken into the application system are also located in the specific room. Alternatively, the portable air conditioners in the other room are moved or relocated to the specific room. The reconstruction of an air conditioning system can also include the dynamic measurement of the temperature distribution of the specific room and determine air flow direction of the fans and the air conditioners to the hot spot.

In some embodiments, the control module 1223 can evaluate each of the searched free/idle IoT devices, and select one or more free IoT devices which can be taken into the application system.

It should be noticed that, for improving accurateness of the reconstructing application systems, efficient network architecture for gathering data can be constructed as in FIG. 6.

The above depicted IoT device management method, system, and network architecture can be used in, such as, a family environment, to monitor and dynamically reconstruct one or more room environment control system, such as a room temperature control system. An example is given below in FIG. 18.

Figure 18:
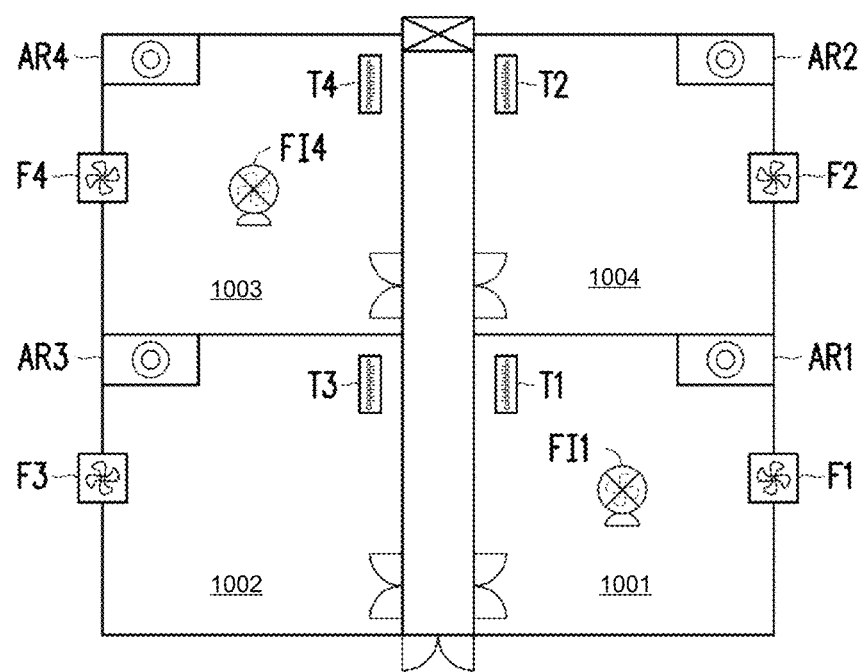
FIG. 18 illustrates an example of automatically monitoring and dynamically reconstructing a room temperature control system, according to various implementations of the disclosure.
Figure 19A:
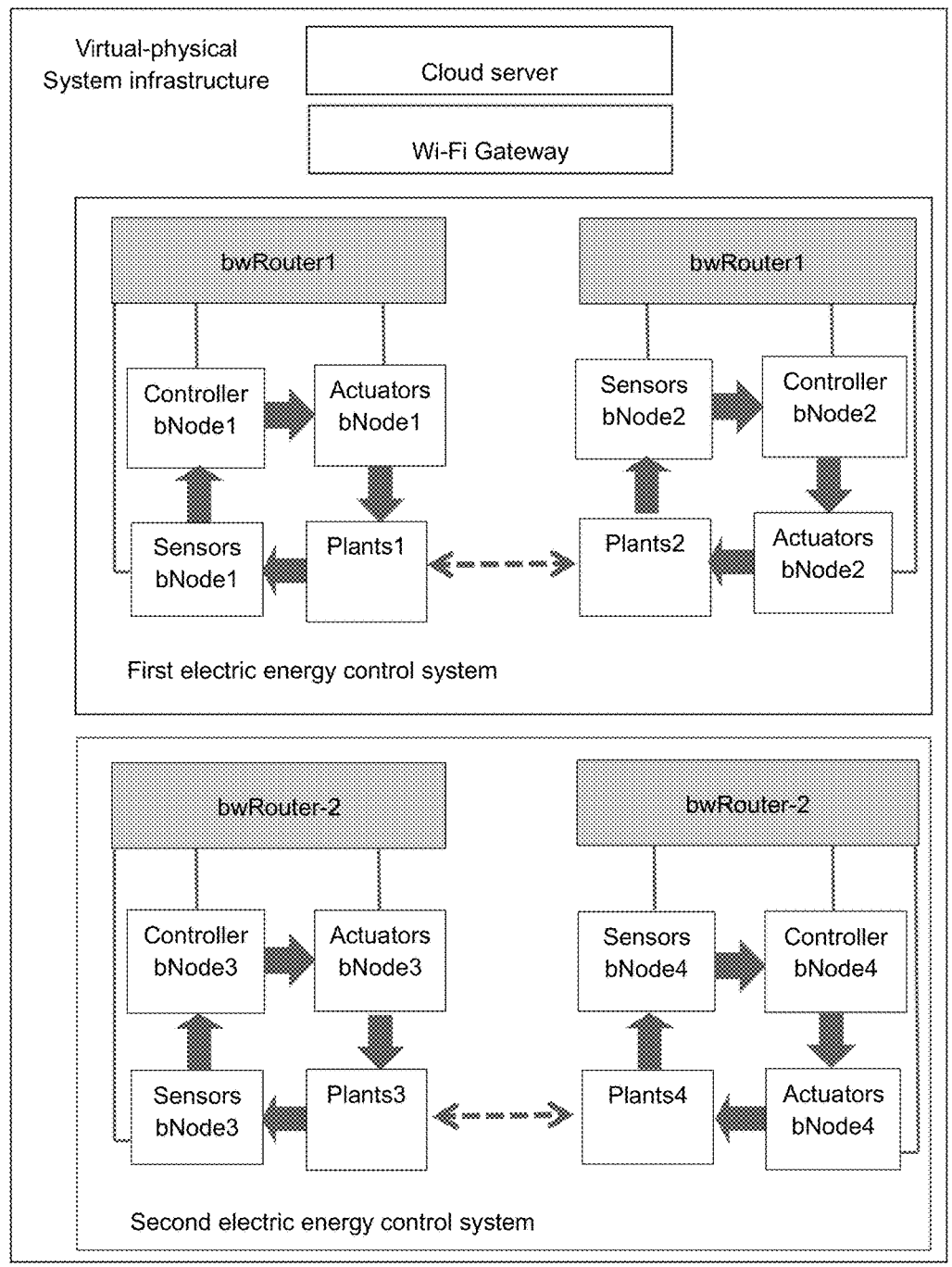
FIGS. 19*a*-19*c*, 20*a*-20*c*, and 21*a*-21*b* illustrate examples of automatically monitoring and dynamically reconstructing electric energy control system, according to various implementations of the disclosure.
Figure 19B:
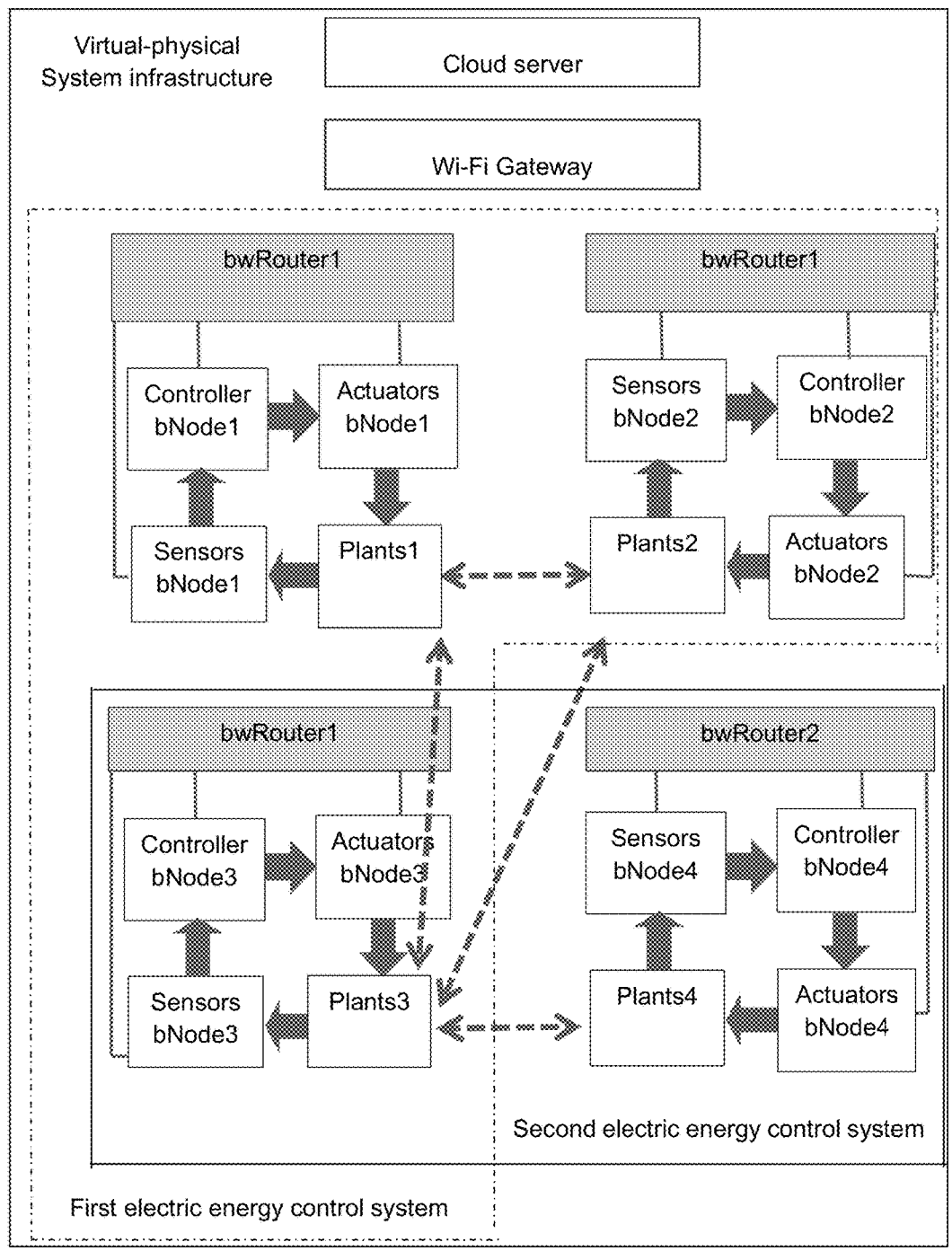
Figure 19C:
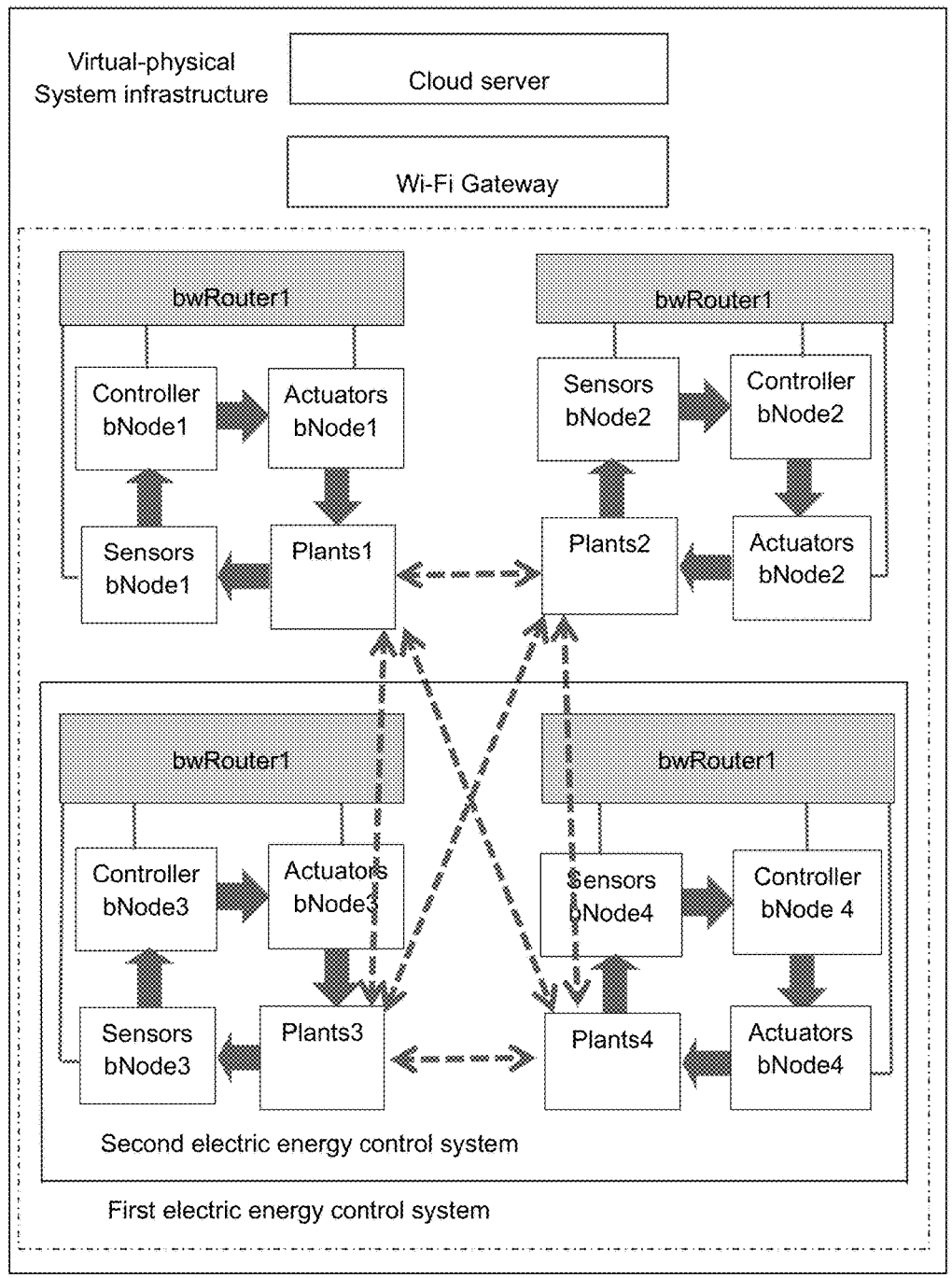

FIG. 18 illustrates an example of automatically monitoring and dynamically reconstructing a room temperature control system, according to various implementations of the disclosure.

In the example illustrated in FIG. 18, a house has four rooms, respectively are room 1001, room 1002, room 1003, and room 1004. Each room has a plurality of information sensing devices and application devices. The information sensing devices include temperature sensing devices T1 to T4. The application devices include air conditioners AR1 to AR4, ventilators F1 to F4, and fans FI1 and FI4. The temperature sensing devices T1 to T4 can include, but are not limited to thermometers. The plurality of information sensing devices and application devices are connected to a control center, such as a cloud server, using a network, such as the Internet.

The room temperature control system includes IoT devices, including temperature sensing devices T1 to T4, and air conditioners AR1 to AR4, and a set of one or more programs installed in the cloud server, and designed for controlling the IoT devices to adjust a room temperature to be 21° C. to 24° C. The temperature can be set by users or obtained from previous sensing data.

The control center can predetermine an evaluation criterion of the room temperature control system to keep the room temperature to be 21° C. to 24° C. When a temperature of the room 1001 is higher than 24° C. and the temperature of the room cannot be adjusted to fall within the temperature range of 21° C. to 24° C. using the air conditioners AR1 to AR4, the control center can determine to reconstruct the room temperature control system. The control center can search for free IoT devices in the house. In some embodiments, the control center can compare related information of the IoT devices in the room temperature control system and related information of the free IoT devices, to select one or more free IoT devices which can be taken into the room temperature control system. The related information can include, such as, locations, working times, types, owners of the IoT devices. For example, according to the location information, idle ventilator and fan FI1 can be taken into the room temperature control system. The control center can also include IoT devices no belonging the current system for emergence cases.

In some embodiments, the control center can evaluate the air conditioner AR1 to determine if the air conditioner AR1 is broken, and remove the air conditioner AR1 from the room temperature control system. The control center further disables the air conditioner AR1.

The above depicted IoT device management method, system, and network architecture cannot only be used in a family environment, but also can be used in a social environment, to monitor and reconstruct one or more social environment control systems, such as electric energy control system. Examples are given below in FIGS. 19a-19c, 20a to 20b, and 21a to 21b.

FIGS. 19a-19c, 20a to 20b, and 21a to 21b illustrate examples of automatically monitoring and dynamically reconstructing electric energy control system, according to various implementations of the disclosure.

Electric and electronic devices consume electric energy to generate desired output (i.e. light, heat, motion, for example). Electric energy consumption is the actual energy demand made on existing electricity supply. Thus, an electric energy control system is needed to supply adequate electrical power.

In the examples, there are two electric energy control systems, namely a first electric energy control system and a second electronic energy control system. In some embodiments, the two electric energy control systems can respectively control electrical supply in two adjacent areas. In each electrical energy control system, a router, such as bwRouter1 or bwRouter2, manages one or more electric power plants (two shown in FIG. 19a, and four shown in FIG. 20a). The electric power plants in one electric energy control system can supply electric energy to each connected power consumers or devices, and can be large power generators, such as nuclear station, fossil-fuel power station, a hydroelectric station; or small power generators, such a solar panel, wind or water paddles, etc.

Figure 20A:
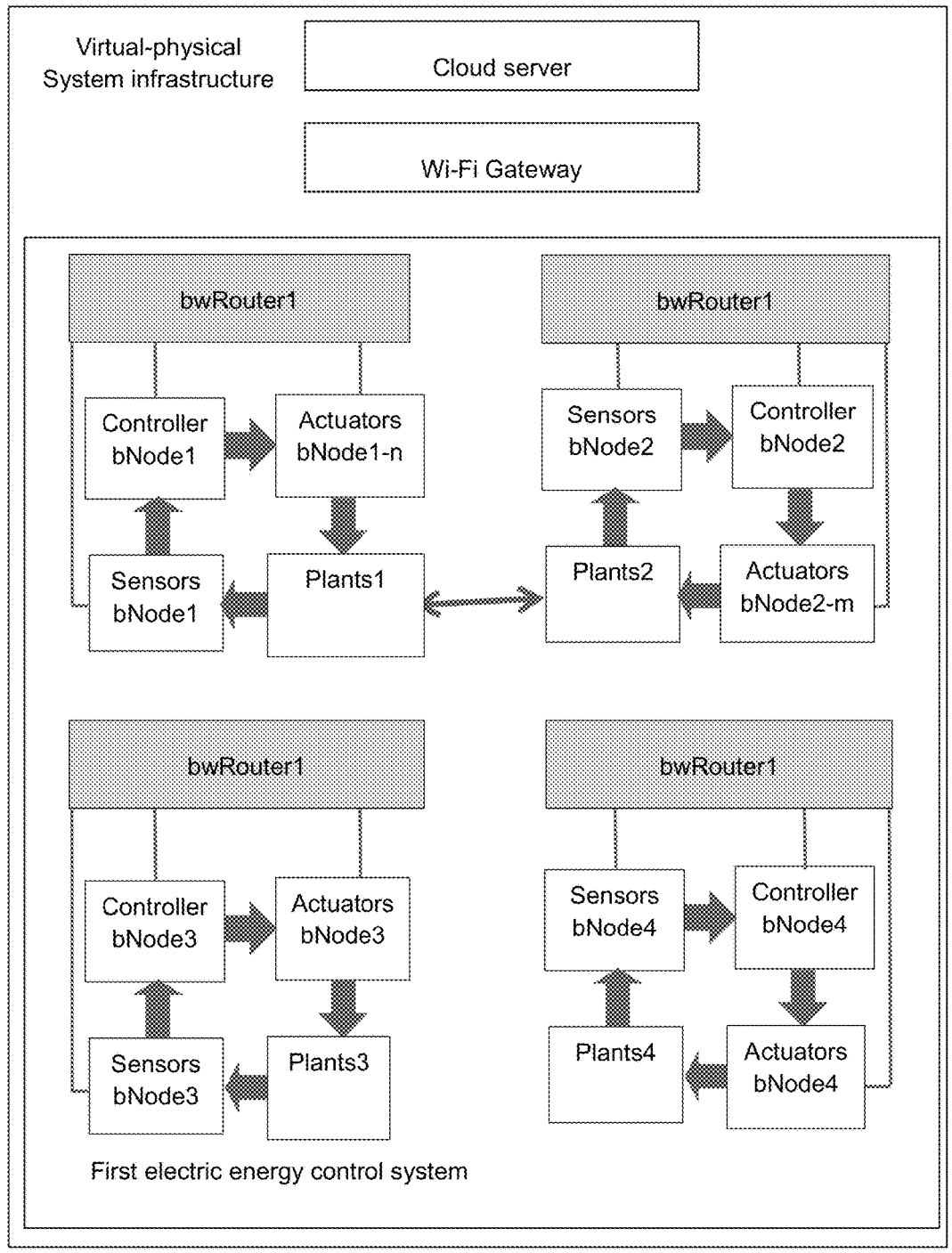
Figure 20B:
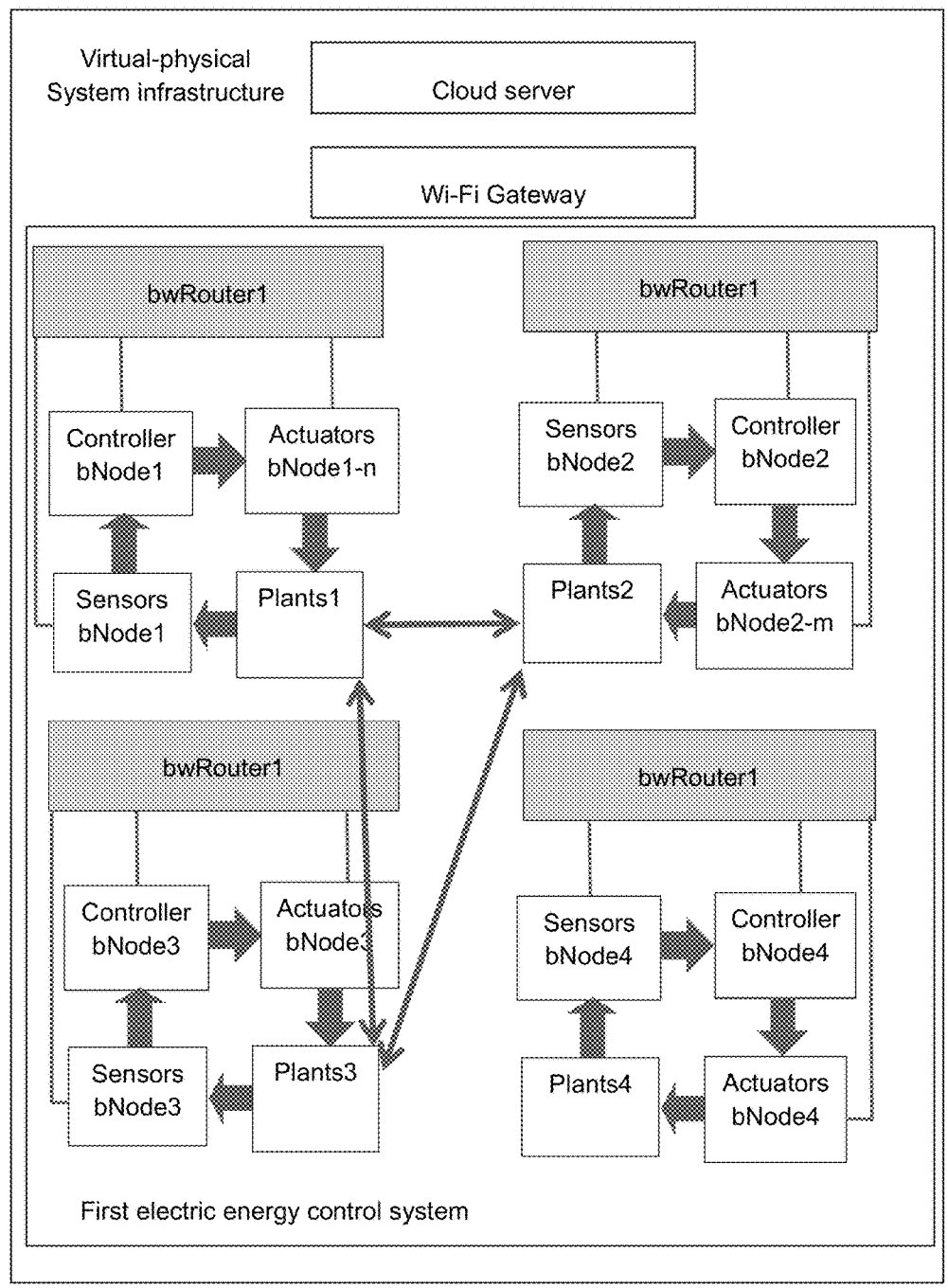
Figure 20C:
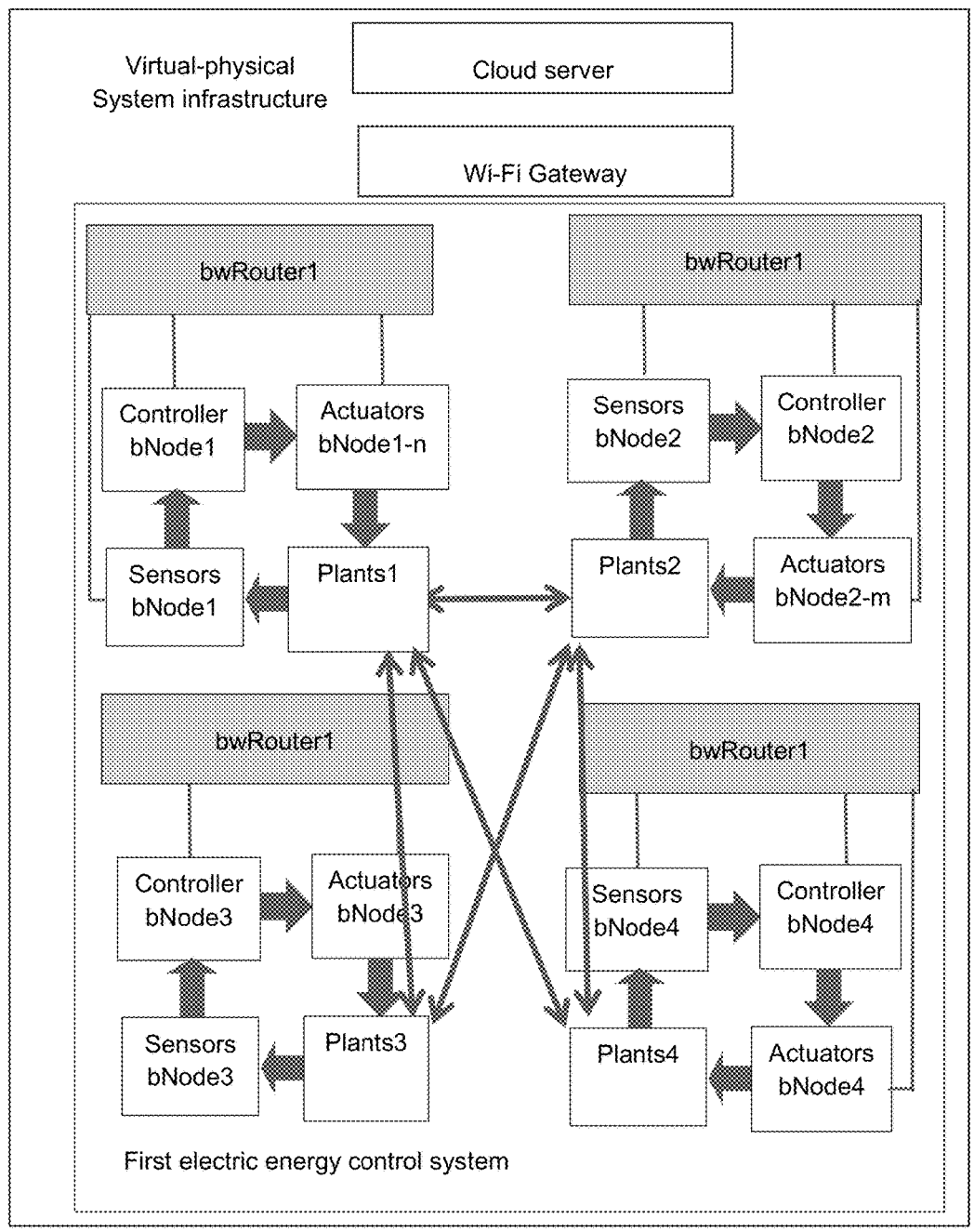
Figure 21A:
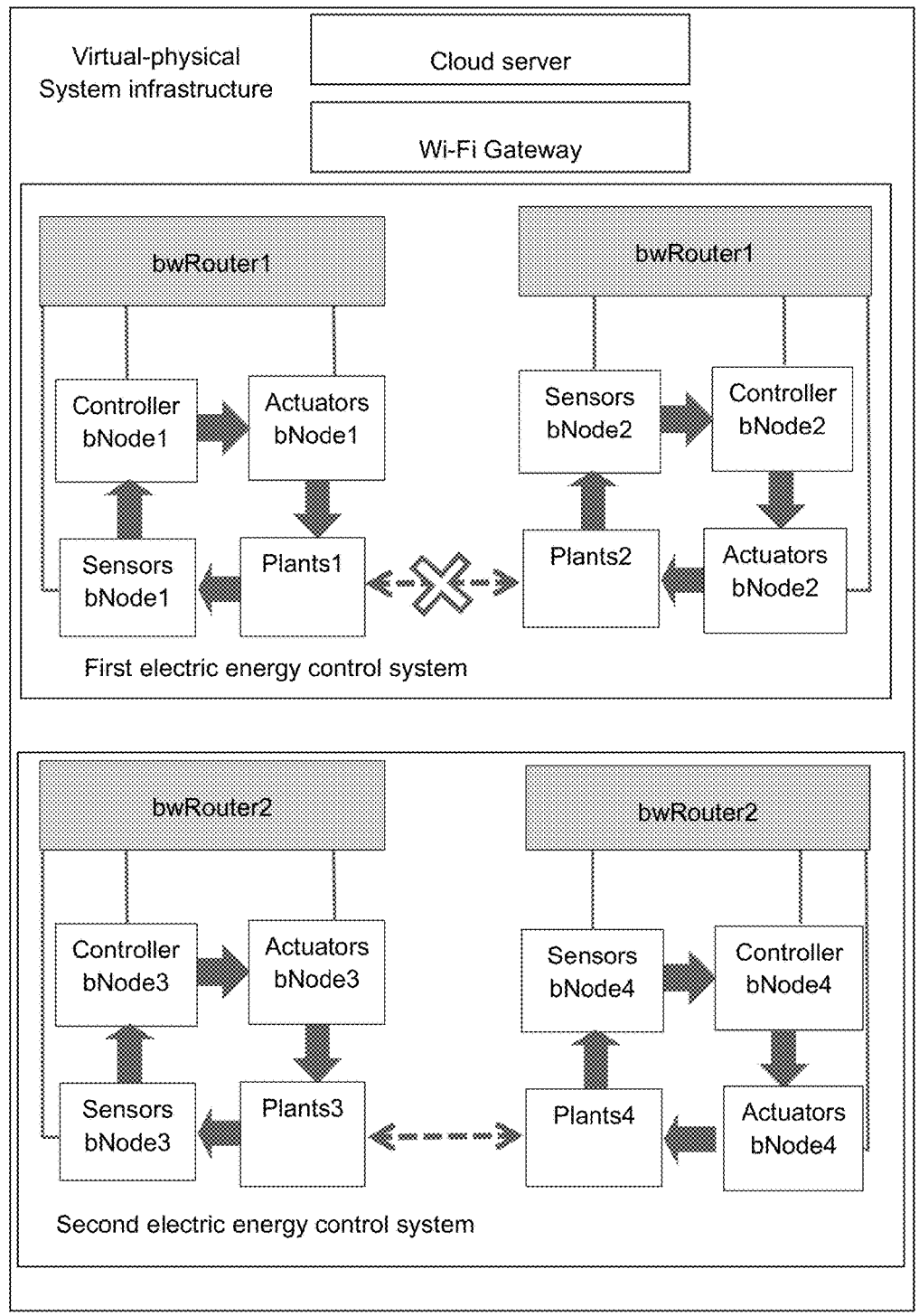
Figure 21B:
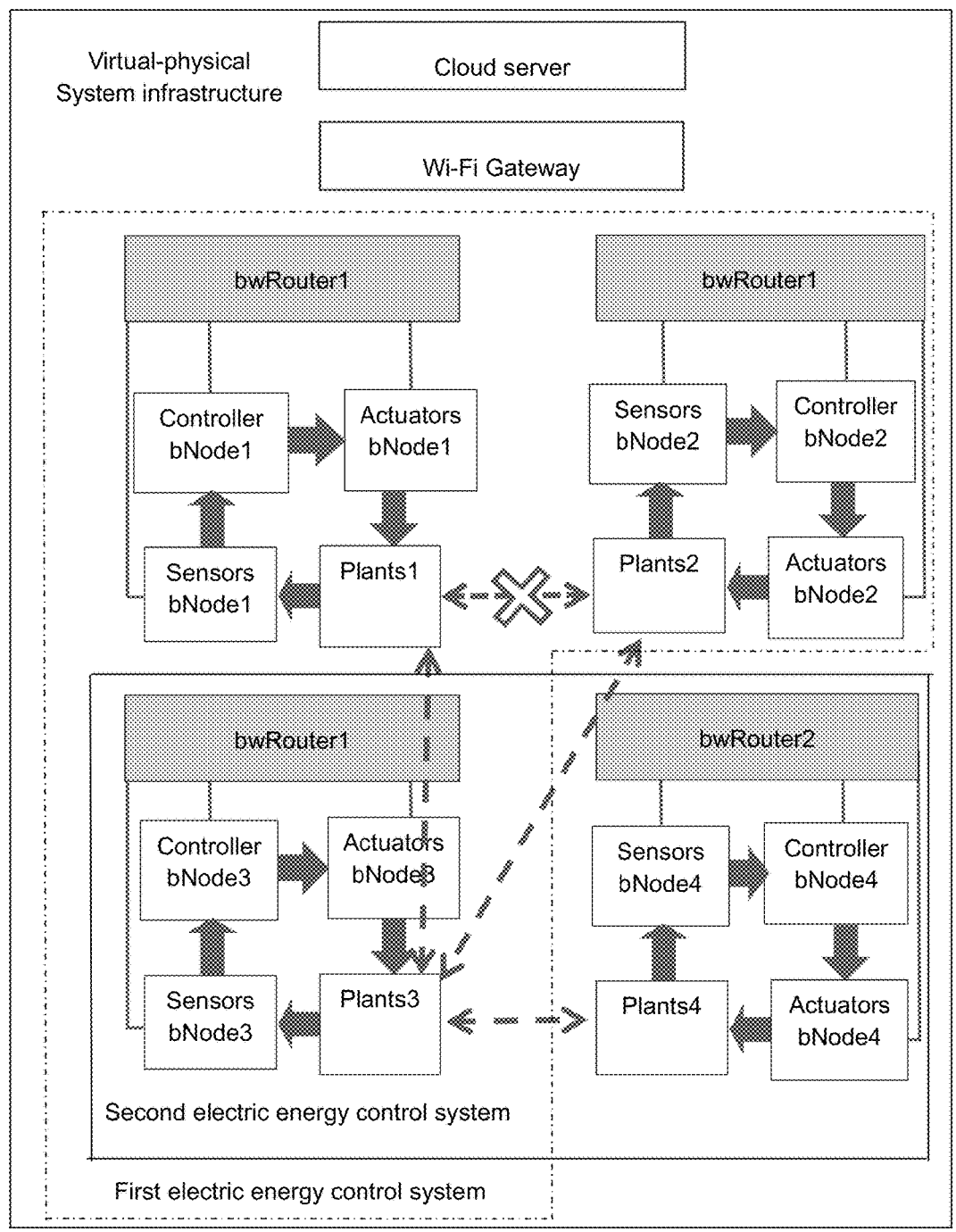

When a cloud server evaluates that the electric power plants in the first electrical energy control system cannot supply adequate electrical power, the cloud server can reconstruct the first electrical energy control system. In one embodiment, the cloud server can reconstruct the first electrical energy control system by enabling free electric power plants in the first electrical energy control system (such as illustrated FIGS. 20b and 20c). Alternatively or additionally, the cloud server can reconstruct the first electrical energy control system by adding one or more electric power plants of the second electrical energy control system into the first electrical energy control system after evaluating the second electric energy control system can supply excess electrical power (such as illustrated FIGS. 19b and 19c).

As mentioned above, the electric power plants in one electrical energy control system can supply electrical energy to each other. In one embodiment, when the cloud server evaluates that the electric power plants in the first electrical energy control system, such as a first electric power plant and a second electric power plant, are disconnected (such as illustrated FIG. 21a), thus, the first electric power plant fails to supply electricity to the second electric power plant. The cloud server can reconstruct the first electrical energy control system by adding one electric power plant of the second electrical energy control system, such as a third electric power plant, into the first electrical energy control system, enabling the first electric power plant supplies electricity to the third electric power plant, and the third electric power plant conveys the electricity to the second electric power plant (such as illustrated FIG. 21b).

More examples relating to the above depicted IoT device management method, system, and network architecture are given for better understanding and using the present disclosure.

In an office building, all devices and people are connected to a control center via a network forming an IoT. In some embodiments, the network can be the Internet and the control center can be a cloud server. In other embodiments, the network can be an intranet that uses Wi-Fi technology or BLUETOOTH technology. The office building is equipped with a plurality of sensors and actuators, anywhere in the office building can be monitored and action taken. The sensors and actuators can be classified into bTag/wTag or bNode/wNode. The bTag and wTag include movable devices which are portable and/or wearable by people. The bNode and wNode include fixed IoT devices, which have fixed coordinate locations.

Each authorized person in the office building can wear or carry a portable communication device. The portable communication device can be a wrist strap, an ID card, a mobile phone, or a tablet, for example. In some embodiments, the portable communication device is embedded with a communication module and one or more sensors. The communication module can be a BLUETOOTH module or a Wi-Fi module. The sensors can include position sensors, and/or physiological parameter sensors, for example. In some embodiments, the portable communication device stores basic information of each person, such as name, age, sex, profession title, educational background, for example.

The communication module can transmit position information and/or basic information of the person upon request or continuously to the control center. According to the position information, the control center can generate a distribution map of the people in the office building. According to the distribution map, the control center can evaluate if an application system, such as a room temperature control system, a light control system, an elevator control system, an access control system, a fire control system, for example, need to be reconstructed. Thus, power consumption can be reduced.

Alternatively or additionally, according to data sensed by physiological parameter sensors, such as the body temperature of the person, the control center can determine a physical state of the person, and can evaluate if an application system, such as a room temperature control system, needs to be reconstructed.

Since there are pluralities of bNodes or wNodes, such as the fixed air conditioners, fixture lights, distributed in the building, which have known locations, the control center can located a particular person with corresponding bTag or wTag quickly.

When the sensors captures an image of a person, however, if no basic information of the person can be obtained, the control center can determine that an unauthorized person enters the office floor. The control center further can determine the location of the unauthorized person and activate security responses.

In another embodiment of an office building, the control center can further act as a patrol system for routine checks. As described above, there are pluralities of bNodes and wNodes, which are integrated with different sensors like thermometer, camera, smoke sensor, and distributed in the office building. The patrol system can automatically generate patrol routes with different priorities for security people based on the sensing data. More specifically, a score is calculated based on the status of each sensor to generate the priorities. For example, a sensor at normal status gives a small score, a camera capturing an unauthorized access gives a large score; a thermometer detecting abnormal high temperature gives a larger score. These sensor nodes can be considered as vertices. A patrol route is a possible way of connecting parts of these vertices and interconnecting elements are edges. There are many ways of selecting edges and thus some requirements are set, such as a maximum number of vertices that the security people can visit for each route, at least one node of each sectors of the office building must be visited for each route, and so on. Then one can use the greedy algorithm, the Lagrangian method or the like to determine an optimize solution(s) based on the status of all sensors described above. The patrol system can be further applied to other environments, such as a factory, a power station or the like. Therefore the status of sensors can further include other cases: abnormal gas releasing, unauthorized movement of restricted items (attached by registered bTags or wTags), sudden peak of power consumption, unusual humidity or light or the like, and each of these cases have a corresponding score recorded in the control center. The threshold values determine abnormality status can be set by users or obtained from previous data.

In some embodiments, there can be not enough available IoT devices or connections nearby to reconstruct an application system. Thus, when reconstructing an application system, there can be a need to transfer IoT devices from other places. The IoT devices which can be transferred can be movable. For example, the IoT device can be an unmanned aerial vehicle (UAV) or be loaded by a UAV.

In some embodiments, in a large farm, a forest, a mountain area, or other wide areas, for safety or other factors, a monitoring system is need. These places are far to reach or without power supply and fixed devices are not suitable in this scenario. Thus, the monitoring system can include a plurality of movable nodes of monitoring devices and communication modules. The monitoring devices can be cameras and/or videos, for example. The communication modules can be Wi-Fi access points (AP) or movable 3G base stations (BS). A UAV, such as a quadcopter or a radio-controlled aircraft can be used to load a monitoring device and/or a communication module, such as illustrated in FIGS. 22 and 23.

Figure 22:
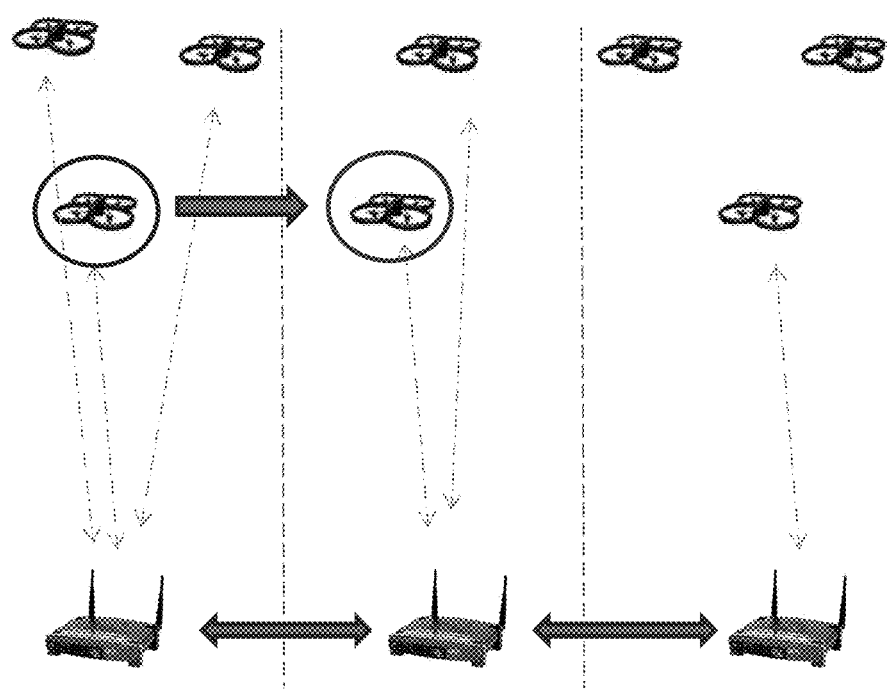
FIGS. 22 and 23 illustrate examples of dynamically reconstructing application systems.

Referring to FIG. 22, the distance between each two fixed Wi-Fi AP can be as far away as a few kilometers that Wi-Fi cannot cover. A plurality of UAVs can include a Wi-Fi Aps forming a Wi-Fi mesh at predefined location. Each UAV also carries monitoring device, and the monitoring data are transmitted to a nearest Wi-Fi AP, towards a fixed Wi-Fi AP, and then arriving at the Cloud Server. The Wi-Fi AP can communicate with each other using PLC, 3G/4G, or Wi-Fi 5.8 GHz.

The UAV can be equipped with a global positioning system (GPS) device to determine the longitude and latitude of the UAV, or fixed bNodes which are set for landscaping. A height of the UAV can be determined according to a fixed reference, such as streetlights, or be computed by a barometric altimeter. Thus the location can be predefined accurately.

Figure 23:
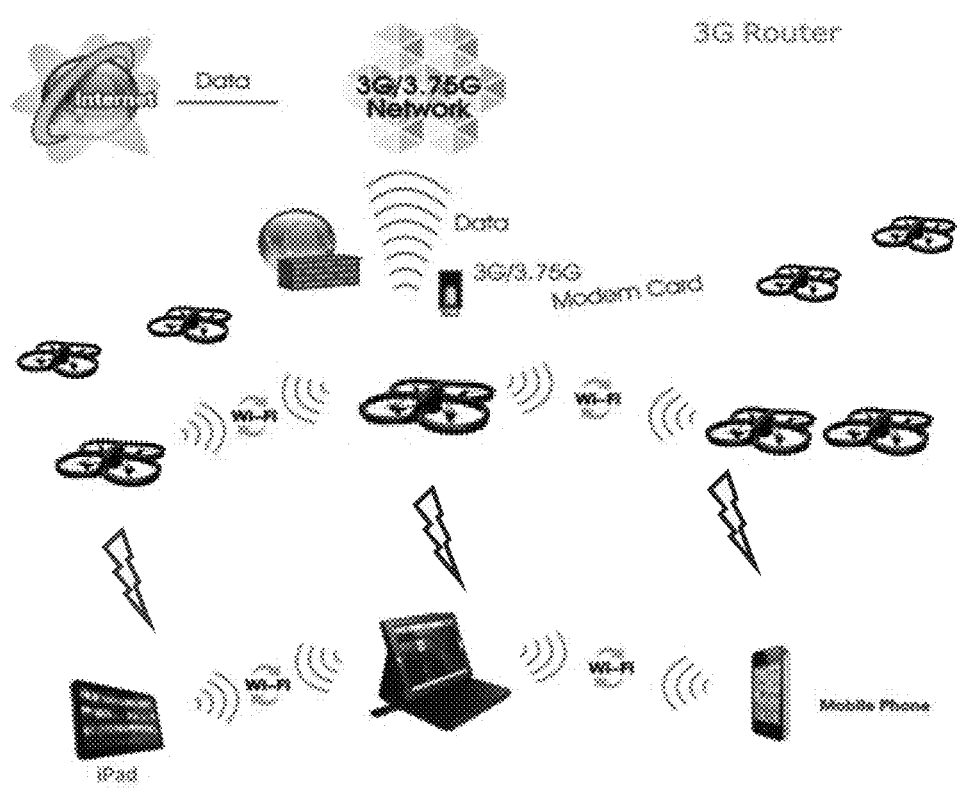

Referring to FIG. 23, each UAV can load a communication node. In such circumstances, for example, in an earthquake area, in an outside concert or sport competition, for example, original communication nodes can be not enough. Thus, a plurality of UAVs loaded a Wi-Fi AP, can form a Wi-Fi mesh providing extra network capacity for temporary use.

Figure 14D:
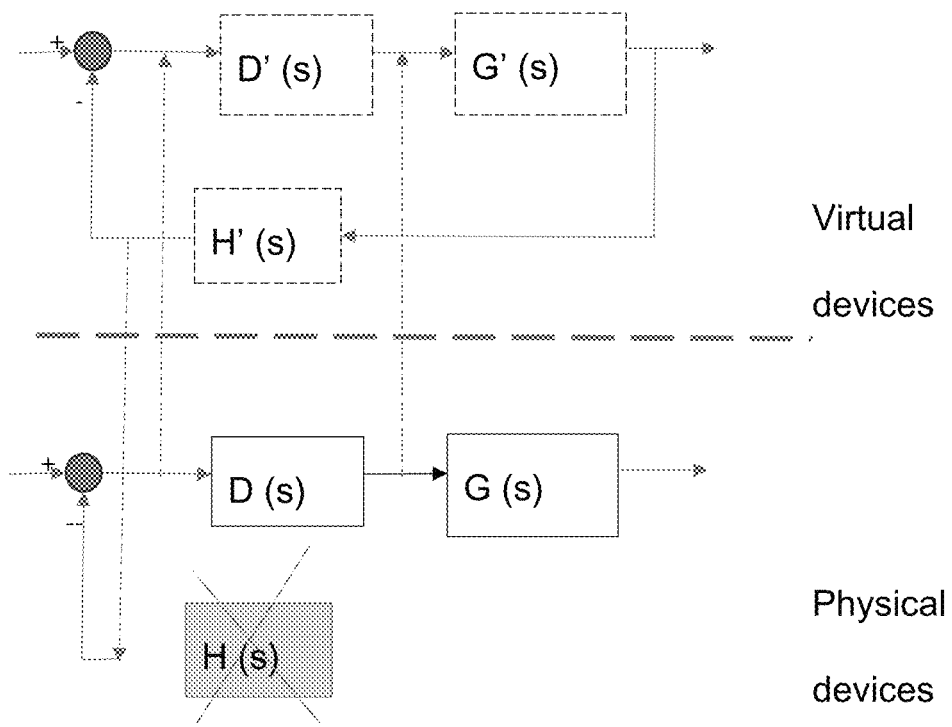

Furthermore, in a previous embodiment as shown in FIGS. 14c and 14d, the control center uses virtual devices when sensors or controllers are broken, UAVs can be sent to the places where these broken devices were installed and replace their functions since various devices can be integrated to UAVs. The reconstructable control system is more flexible and instant with the mobility of UAVs.

In some embodiments, the UAV can load other IoT devices, such as actuators for specific situations. For example, in a fire scenario in a forest, the UAV can load dry fire-fighting powders like sodium bicarbonate or monoammonium phosphate to distinguish fire; it can also bring a polarity of sensors and a storage then fly to dangerous or unreachable areas according to GPS setting to collect data then fly back. It can also use as an emergency carrier in a breakout area, the UAV can load food, water, and medicine, and so on. These UAVs can do multiple trips including recharging automatically until the need of resource is fulfilled. These UAVs can also be mission-oriented which can be reassigned, or regrouped or reconfigured.

It will be apparent to those skilled in the art that various modifications and variations can be made to the disclosed embodiments without departing from the scope or spirit of the present disclosure. In view of the foregoing, it is intended that the present disclosure covers modifications and variations provided that they fall within the scope of the following claims and their equivalents.

What is claimed is:

1. A cloud server in a location-based network system having at least one communication node with fixed coordinate location information, comprising:

a communication chip for indirectly communicating with the at least one communication node to obtain or recognize fixed coordinate location information of the at least one communication node, and a processor configured to:
predetermine an evaluation criterion for an application system having a plurality of IoT devices;
evaluate the application system; and
determine whether the application system meets a corresponding evaluation criterion, wherein when one of the IoT devices in the application system is broken, the processor is further configured to replace a broken IoT device by generating a virtual device corresponding to the broken IoT device.

2. The cloud server according to claim 1, wherein the fixed coordinate location information includes latitude, longitude, and altitude.

3. The cloud server according to claim 1, wherein the cloud server obtains a location of the application system based on the fixed coordinate location information of the at least one communication node.

4. The cloud server according to claim 1, wherein when the application system does not meet a corresponding evaluation criterion, the application system evaluates each IoT device in the application system according to the evaluation criterion, and determines whether to reconstruct the application system according to an evaluation result to each IoT device.

5. The cloud server according to claim 4, wherein the processor is further configured to reconstruct the application system according to an evaluation result to each IoT device.

6. The cloud server according to claim 5, wherein the processor is further configured to search for one or more free/idle IoT devices and evaluate each of the searched free/idle IoT devices based on a related information of the searched free/idle IoT devices that needs to be partially matched with the IoT devices in the application system.

7. The cloud server according to claim 1, wherein the processor is further configured to recognize an event happening when the application system does not meet a corresponding evaluation criterion, and determine a solution corresponding to the event by analyzing a cause of the event and linking to a solution database.

8. A location-based network system, comprising:
at least one communication node having fixed coordinate location information, and a cloud server, comprising:
a communication chip for indirectly communicating with the at least one communication node to obtain or recognize fixed coordinate location information of the at least one communication node, and
a processor configured to:
predetermine an evaluation criterion for an application system having a plurality of IoT devices;
evaluate the application system; and
determine whether the application system meets a corresponding evaluation criterion, wherein when one of the IoT devices in the application system is broken, the processor is further configured to replace a broken IoT device by generating a virtual device corresponding to the broken IoT device.

9. The location-based network system according to claim 8, wherein the location based network system further comprises a switch node and at least one IoT device communicating via the at least one communication node.

10. The location-based network system according to claim 8, wherein the fixed coordinate location information includes latitude, longitude, and altitude.

11. The location-based network system according to claim 8, wherein the cloud server obtains a location of the application system based on the fixed coordinate location information of the at least one communication node.

12. The location-based network system according to claim 8, wherein when the application system does not meet a corresponding evaluation criterion, the application system evaluates each IoT device in the application system according to the evaluation criterion, and determines whether to reconstruct the application system according to an evaluation result to each IoT device.

13. The location-based network system according to claim 12, wherein the processor is further configured to reconstruct the application system according to an evaluation result to each IoT device.

14. The location-based network system according to claim 13, wherein the processor is further configured to search for one or more free/idle IoT devices and evaluate each of the searched free/idle IoT devices based on a related information of the searched free/idle IoT devices that needs to be partially matched with the IoT devices in the application system.

15. The location-based network system according to claim 14, wherein the processor is further configured to determine that an IoT device is an unmanned aerial vehicle (UAV) or is loaded by the UAV.

16. The location-based network system according to claim 8, wherein the processor is further configured to recognize an event happening when the application system does not meet a corresponding evaluation criterion, and determine a solution corresponding to the event by analyzing a cause of the event and linking to a solution database.

17. A method for dynamically reconstructing an application system having a plurality of IoT devices in a location-based network system having at least one communication node with fixed coordinate location information, comprising:
obtaining a location of the application system based on the fixed coordinate location information of the at least one communication node, the fixed coordinate location information including latitude, longitude, and altitude;
predetermining an evaluation criterion for an application system;
evaluating the application system;
determining whether the application system meets a corresponding evaluation criterion; and
when one of the IoT devices in the application system is broken, replacing a broken IoT device by generating a virtual device corresponding to the broken IoT device.

18. The method for dynamically reconstructing an application system in a location-based network system according to claim 17, further comprising: evaluating each IoT device in the application system according to the evaluation criterion, and determining whether to reconstruct the application system according to an evaluation result to each IoT device.

19. The method for dynamically reconstructing an application system in a location-based network system according to claim 17, further comprising: searching for one or more free/idle IoT devices, and evaluating each of the searched free/idle IoT devices based on a related information of the searched free/idle IoT devices that needs to be partially matched with the IoT devices in the application system.

20. The method for dynamically reconstructing an application system in a location-based network system according to claim 17, further comprising: recognizing an event happening when the application system does not meet a corresponding evaluation criterion, and determining a solution corresponding to the event by analyzing a cause of the event and linking to a solution database.

\* \* \* \* \*